(12) United States Patent
Moorti et al.

(10) Patent No.: US 10,541,840 B2
(45) Date of Patent: Jan. 21, 2020

(54) SYSTEMS AND METHODS FOR ADAPTIVELY-TUNED DIGITAL SELF-INTERFERENCE CANCELLATION

(71) Applicant: Kumu Networks, Inc., Sunnyvale, CA (US)

(72) Inventors: Rajendra Tushar Moorti, Sunnyvale, CA (US); Jung-Il Choi, Saratoga, CA (US); Mayank Jain, San Jose, CA (US)

(73) Assignee: Kumu Networks, Inc., Sunnyvale, CA (US)

( * ) Notice: Subject to any disclaimer, the term of this patent is extended or adjusted under 35 U.S.C. 154(b) by 0 days.

(21) Appl. No.: 16/229,906

(22) Filed: Dec. 21, 2018

(65) Prior Publication Data
US 2019/0123940 A1 Apr. 25, 2019

Related U.S. Application Data

(63) Continuation of application No. 15/648,332, filed on Jul. 12, 2017, now Pat. No. 10,200,217, which is a
(Continued)

(51) Int. Cl.
*H04L 25/03* (2006.01)
*H04L 27/26* (2006.01)
(Continued)

(52) U.S. Cl.
CPC .... *H04L 25/03006* (2013.01); *H04L 25/0204* (2013.01); *H04L 25/0328* (2013.01); *H04L 27/265* (2013.01); *H04L 47/29* (2013.01)

(58) Field of Classification Search
CPC .. H04L 25/03006; H04L 47/29; H04L 27/265
See application file for complete search history.

(56) References Cited

U.S. PATENT DOCUMENTS

| 3,922,617 A | 11/1975 | Denniston et al. |
| 4,321,624 A | 3/1982 | Gibson et al. |

(Continued)

FOREIGN PATENT DOCUMENTS

| CN | 1204898 A | 1/1999 |
| CN | 1901362 A | 1/2007 |

(Continued)

OTHER PUBLICATIONS

"Mcmichael et al., "Optimal Tuning of Analog Self-Interference Cancellers for Full-Duple Wireless Communication", Oct. 1-5, 2012, Fiftieth Annual Allerton Conference, Illinois, USA, pp. 246-251."
(Continued)

*Primary Examiner* — Kenneth T Lam
(74) *Attorney, Agent, or Firm* — Jeffrey Schox; Samuel Rosenthal

(57) ABSTRACT

A method for adaptively-tuned digital self-interference cancellation includes generating a digital self-interference cancellation signal from a digital transmit signal based on a transform configuration; combining the digital self-interference cancellation signal with a receive signal to form a digital residue signal; generating a composite residue signal from the digital residue signal and the digital transmit signal; and updating the transform configuration based on the composite residue signal.

21 Claims, 20 Drawing Sheets

Related U.S. Application Data continuation of application No. 15/362,289, filed on Nov. 28, 2016, now Pat. No. 9,742,593.

(60) Provisional application No. 62/268,388, filed on Dec. 16, 2015.

(51) Int. Cl.
  *H04L 12/801* (2013.01)
  *H04L 25/02* (2006.01)

(56) References Cited

U.S. PATENT DOCUMENTS

| | | |
|---|---|---|
| 4,952,193 A | 8/1990 | Talwar |
| 5,212,827 A | 5/1993 | Meszko et al. |
| 5,691,978 A | 11/1997 | Kenworthy |
| 5,734,957 A | 3/1998 | Ogawa et al. |
| 5,790,658 A | 8/1998 | Yip et al. |
| 5,818,385 A | 10/1998 | Bartholomew |
| 5,930,301 A | 7/1999 | Chester et al. |
| 6,215,812 B1 | 4/2001 | Young et al. |
| 6,240,150 B1 | 5/2001 | Darveau et al. |
| 6,411,250 B1 | 6/2002 | Oswald et al. |
| 6,490,328 B1 | 12/2002 | Wu |
| 6,539,204 B1 | 3/2003 | Marsh et al. |
| 6,567,649 B2 | 5/2003 | Souissi |
| 6,580,771 B2 | 6/2003 | Kenney |
| 6,639,551 B2 | 10/2003 | Li et al. |
| 6,657,950 B1 | 12/2003 | Jones et al. |
| 6,686,879 B2 | 2/2004 | Shattil |
| 6,725,017 B2 | 4/2004 | Blount et al. |
| 6,778,599 B1 | 8/2004 | Doron |
| 6,907,093 B2 | 6/2005 | Blount et al. |
| 6,915,112 B1 | 7/2005 | Sutton et al. |
| 6,965,657 B1 | 11/2005 | Rezvani et al. |
| 6,985,705 B2 | 1/2006 | Shohara |
| 7,057,472 B2 | 6/2006 | Fukamachi et al. |
| 7,139,543 B2 | 11/2006 | Shah |
| 7,177,341 B2 | 2/2007 | McCorkle |
| 7,188,135 B2 | 3/2007 | Takatori et al. |
| 7,228,104 B2 | 6/2007 | Collins et al. |
| 7,266,358 B2 | 9/2007 | Hillstrom |
| 7,302,024 B2 | 11/2007 | Arambepola |
| 7,336,128 B2 | 2/2008 | Suzuki et al. |
| 7,336,940 B2 | 2/2008 | Smithson |
| 7,348,844 B2 | 3/2008 | Jaenecke |
| 7,349,505 B2 | 3/2008 | Blount et al. |
| 7,362,257 B2 | 4/2008 | Bruzzone et al. |
| 7,372,420 B1 | 5/2008 | Osterhues et al. |
| 7,397,843 B2 | 7/2008 | Grant et al. |
| 7,426,242 B2 | 9/2008 | Thesling |
| 7,508,898 B2 | 3/2009 | Cyr et al. |
| 7,509,100 B2 | 3/2009 | Toncich |
| 7,706,755 B2 | 4/2010 | Muhammad et al. |
| 7,733,813 B2 | 6/2010 | Shin et al. |
| 7,773,759 B2 | 8/2010 | Alves et al. |
| 7,773,950 B2 | 8/2010 | Wang et al. |
| 7,778,611 B2 | 8/2010 | Asai et al. |
| 7,869,527 B2 | 1/2011 | Vetter et al. |
| 7,948,878 B2 | 5/2011 | Briscoe et al. |
| 7,962,170 B2 | 6/2011 | Axness et al. |
| 7,987,363 B2 | 7/2011 | Chauncey et al. |
| 7,999,715 B2 | 8/2011 | Yamaki et al. |
| 8,005,235 B2 | 8/2011 | Rebandt et al. |
| 8,023,438 B2 | 9/2011 | Kangasmaa et al. |
| 8,027,642 B2 | 9/2011 | Proctor et al. |
| 8,031,744 B2 | 10/2011 | Radunovic et al. |
| 8,032,183 B2 | 10/2011 | Rudrapatna |
| 8,055,235 B1 | 11/2011 | Gupta et al. |
| 8,060,803 B2 | 11/2011 | Kim |
| 8,081,695 B2 | 12/2011 | Chrabieh et al. |
| 8,085,831 B2 | 12/2011 | Teague |
| 8,086,191 B2 | 12/2011 | Fukuda et al. |
| 8,090,320 B2 | 1/2012 | Dent et al. |
| 8,155,046 B2 | 4/2012 | Jung et al. |
| 8,155,595 B2 | 4/2012 | Sahin et al. |
| 8,160,176 B2 | 4/2012 | Dent et al. |
| 8,175,535 B2 | 5/2012 | Mu |
| 8,179,990 B2 | 5/2012 | Orlik et al. |
| 8,218,697 B2 | 7/2012 | Guess et al. |
| 8,270,456 B2 | 9/2012 | Leach et al. |
| 8,274,342 B2 | 9/2012 | Tsutsumi et al. |
| 8,300,561 B2 | 10/2012 | Elahi et al. |
| 8,306,480 B2 | 11/2012 | Muhammad et al. |
| 8,331,477 B2 | 12/2012 | Huang et al. |
| 8,349,933 B2 | 1/2013 | Bhandari et al. |
| 8,351,533 B2 | 1/2013 | Shrivastava et al. |
| 8,385,855 B2 | 2/2013 | Lorg et al. |
| 8,385,871 B2 | 2/2013 | Wyville |
| 8,391,878 B2 | 3/2013 | Tenny |
| 8,417,750 B2 | 4/2013 | Yan et al. |
| 8,422,540 B1 | 4/2013 | Negus et al. |
| 8,428,542 B2 | 4/2013 | Bornazyan |
| 8,446,892 B2 | 5/2013 | Ji et al. |
| 8,456,230 B2 | 6/2013 | Fratti |
| 8,457,549 B2 | 6/2013 | Weng et al. |
| 8,462,697 B2 | 6/2013 | Park et al. |
| 8,467,757 B2 | 6/2013 | Ahn |
| 8,498,585 B2 | 7/2013 | Vandenameele |
| 8,502,924 B2 | 8/2013 | Liou et al. |
| 8,509,129 B2 | 8/2013 | Deb et al. |
| 8,521,090 B2 | 8/2013 | Kim et al. |
| 8,576,752 B2 | 11/2013 | Sarca |
| 8,600,331 B2 | 12/2013 | Kravets |
| 8,611,401 B2 | 12/2013 | Lakkis |
| 8,619,916 B2 | 12/2013 | Jong |
| 8,625,686 B2 | 1/2014 | Li et al. |
| 8,626,090 B2 | 1/2014 | Dalipi |
| 8,649,417 B2 | 2/2014 | Baldemair et al. |
| 8,711,943 B2 | 4/2014 | Rossato et al. |
| 8,744,377 B2 | 6/2014 | Rimini et al. |
| 8,750,786 B2 | 6/2014 | Larsson et al. |
| 8,755,756 B1 | 6/2014 | Zhang et al. |
| 8,767,869 B2 | 7/2014 | Rimini et al. |
| 8,787,907 B2 | 7/2014 | Jain et al. |
| 8,798,177 B2 | 8/2014 | Park et al. |
| 8,804,975 B2 | 8/2014 | Harris et al. |
| 8,837,332 B2 | 9/2014 | Khojastepour et al. |
| 8,842,584 B2 | 9/2014 | Jana et al. |
| 8,879,433 B2 | 11/2014 | Khojastepour et al. |
| 8,879,811 B2 | 11/2014 | Liu et al. |
| 8,913,528 B2 | 12/2014 | Cheng et al. |
| 8,929,550 B2 | 1/2015 | Shattil et al. |
| 8,995,410 B2 | 3/2015 | Balan et al. |
| 9,014,069 B2 | 4/2015 | Patil et al. |
| 9,019,849 B2 | 4/2015 | Hui et al. |
| 9,031,567 B2 | 5/2015 | Haub |
| 9,042,838 B2 | 5/2015 | Braithwaite |
| 9,054,795 B2 | 6/2015 | Choi et al. |
| 9,065,519 B2 | 6/2015 | Cyzs et al. |
| 9,077,421 B1 * | 7/2015 | Mehlman ............... H04B 1/10 |
| 9,112,476 B2 | 8/2015 | Basaran et al. |
| 9,124,475 B2 | 9/2015 | Li et al. |
| 9,130,747 B2 | 9/2015 | Zinser et al. |
| 9,136,883 B1 | 9/2015 | Moher et al. |
| 9,160,430 B2 | 10/2015 | Maltsev et al. |
| 9,166,766 B2 | 10/2015 | Jana et al. |
| 9,184,902 B2 | 11/2015 | Khojastepour et al. |
| 9,185,711 B2 | 11/2015 | Lin et al. |
| 9,231,647 B2 | 1/2016 | Polydoros et al. |
| 9,231,712 B2 | 1/2016 | Hahn et al. |
| 9,236,996 B2 | 1/2016 | Khandani |
| 9,264,024 B2 | 2/2016 | Shin et al. |
| 9,276,682 B2 * | 3/2016 | Bharadia ............... H04B 1/00 |
| 9,312,895 B1 | 4/2016 | Gupta et al. |
| 9,325,432 B2 | 4/2016 | Hong et al. |
| 9,331,737 B2 | 5/2016 | Hong et al. |
| 9,413,500 B2 | 8/2016 | Chincholi et al. |
| 9,413,516 B2 | 8/2016 | Khandani |
| 9,455,761 B2 * | 9/2016 | Bharadia ............... H04B 1/00 |
| 9,461,698 B2 | 10/2016 | Moffatt et al. |
| 9,490,963 B2 | 11/2016 | Choi et al. |
| 9,537,543 B2 | 1/2017 | Choi |
| 9,647,705 B2 | 5/2017 | Pack et al. |

(56) References Cited

U.S. PATENT DOCUMENTS

| | | |
|---|---|---|
| 9,698,860 B2 | 7/2017 | Bharadia et al. |
| 9,698,861 B2 | 7/2017 | Braithwaite |
| 9,713,010 B2 | 7/2017 | Khandani |
| 9,742,593 B2 * | 8/2017 | Moorti .............. H04L 25/03006 |
| 9,935,757 B2 | 4/2018 | Chung et al. |
| 9,973,224 B2 | 5/2018 | Liu et al. |
| 10,200,217 B2 * | 2/2019 | Moorti .............. H04L 25/03006 |
| 2002/0034191 A1 | 3/2002 | Shattil |
| 2002/0064245 A1 | 5/2002 | McCorkle |
| 2002/0072344 A1 | 6/2002 | Souissi |
| 2002/0109631 A1 | 8/2002 | Li et al. |
| 2002/0154717 A1 | 10/2002 | Shima et al. |
| 2002/0172265 A1 | 11/2002 | Kenney |
| 2003/0031279 A1 | 2/2003 | Blount et al. |
| 2003/0099287 A1 | 5/2003 | Arambepola |
| 2003/0104787 A1 | 6/2003 | Blount et al. |
| 2003/0112860 A1 | 6/2003 | Erdogan |
| 2003/0148748 A1 | 8/2003 | Shah |
| 2004/0106381 A1 | 6/2004 | Tiller |
| 2004/0266378 A1 | 12/2004 | Fukamachi et al. |
| 2005/0030888 A1 | 2/2005 | Thesling |
| 2005/0078743 A1 | 4/2005 | Shohara |
| 2005/0094722 A1 | 5/2005 | Takatori et al. |
| 2005/0101267 A1 | 5/2005 | Smithson |
| 2005/0129152 A1 | 6/2005 | Hillstrom |
| 2005/0159128 A1 | 7/2005 | Collins et al. |
| 2005/0190870 A1 | 9/2005 | Blount et al. |
| 2005/0250466 A1 | 11/2005 | Varma et al. |
| 2005/0254555 A1 | 11/2005 | Teague |
| 2005/0282500 A1 | 12/2005 | Wang et al. |
| 2006/0029124 A1 | 2/2006 | Grant et al. |
| 2006/0030277 A1 | 2/2006 | Cyr et al. |
| 2006/0058022 A1 | 3/2006 | Webster et al. |
| 2006/0083297 A1 | 4/2006 | Yan et al. |
| 2006/0153283 A1 | 7/2006 | Scharf et al. |
| 2006/0209754 A1 | 9/2006 | Ji et al. |
| 2006/0240769 A1 | 10/2006 | Proctor et al. |
| 2006/0273853 A1 | 12/2006 | Suzuki et al. |
| 2007/0018722 A1 | 1/2007 | Jaenecke |
| 2007/0105509 A1 | 5/2007 | Muhammad et al. |
| 2007/0207747 A1 | 9/2007 | Johnson et al. |
| 2007/0207748 A1 | 9/2007 | Toncich |
| 2007/0223617 A1 | 9/2007 | Lee et al. |
| 2007/0249314 A1 | 10/2007 | Sanders et al. |
| 2007/0274372 A1 | 11/2007 | Asai et al. |
| 2007/0283220 A1 | 12/2007 | Kim |
| 2007/0296625 A1 | 12/2007 | Bruzzone et al. |
| 2008/0037801 A1 | 2/2008 | Alves et al. |
| 2008/0075189 A1 | 3/2008 | Li et al. |
| 2008/0089397 A1 | 4/2008 | Vetter et al. |
| 2008/0107046 A1 | 5/2008 | Kangasmaa et al. |
| 2008/0111754 A1 | 5/2008 | Osterhues et al. |
| 2008/0131133 A1 | 6/2008 | Blunt et al. |
| 2008/0144852 A1 | 6/2008 | Rebandt et al. |
| 2008/0192636 A1 | 8/2008 | Briscoe et al. |
| 2008/0219339 A1 | 9/2008 | Chrabieh et al. |
| 2008/0219377 A1 | 9/2008 | Nisbet |
| 2008/0279122 A1 | 11/2008 | Fukuda et al. |
| 2009/0022089 A1 | 1/2009 | Rudrapatna |
| 2009/0034437 A1 | 2/2009 | Shin et al. |
| 2009/0047914 A1 | 2/2009 | Axness et al. |
| 2009/0115912 A1 | 5/2009 | Liou et al. |
| 2009/0180404 A1 | 7/2009 | Jung et al. |
| 2009/0186582 A1 | 7/2009 | Muhammad et al. |
| 2009/0213770 A1 | 8/2009 | Mu |
| 2009/0221231 A1 | 9/2009 | Murch et al. |
| 2009/0262852 A1 | 10/2009 | Orlik et al. |
| 2009/0303908 A1 | 12/2009 | Deb et al. |
| 2010/0014600 A1 | 1/2010 | Li et al. |
| 2010/0014614 A1 | 1/2010 | Leach et al. |
| 2010/0022201 A1 | 1/2010 | Vandenameele |
| 2010/0031036 A1 | 2/2010 | Chauncey et al. |
| 2010/0056166 A1 | 3/2010 | Tenny |
| 2010/0103900 A1 | 4/2010 | Ahn et al. |
| 2010/0117693 A1 | 5/2010 | Buer et al. |
| 2010/0136900 A1 | 6/2010 | Seki |
| 2010/0150033 A1 | 6/2010 | Zinser et al. |
| 2010/0150070 A1 | 6/2010 | Chae et al. |
| 2010/0159837 A1 | 6/2010 | Dent et al. |
| 2010/0159858 A1 | 6/2010 | Dent et al. |
| 2010/0165895 A1 | 7/2010 | Elahi et al. |
| 2010/0208854 A1 | 8/2010 | Guess et al. |
| 2010/0215124 A1 | 8/2010 | Zeong et al. |
| 2010/0226356 A1 | 9/2010 | Sahin et al. |
| 2010/0226416 A1 | 9/2010 | Dent et al. |
| 2010/0226448 A1 | 9/2010 | Dent |
| 2010/0232324 A1 | 9/2010 | Radunovic et al. |
| 2010/0266057 A1 | 10/2010 | Shrivastava et al. |
| 2010/0279602 A1 | 11/2010 | Larsson et al. |
| 2010/0295716 A1 | 11/2010 | Yamaki et al. |
| 2011/0013684 A1 | 1/2011 | Semenov et al. |
| 2011/0013735 A1 | 1/2011 | Huang et al. |
| 2011/0026509 A1 | 2/2011 | Tanaka |
| 2011/0081880 A1 | 4/2011 | Ahn |
| 2011/0149714 A1 | 6/2011 | Rimini et al. |
| 2011/0171922 A1 | 7/2011 | Kim et al. |
| 2011/0216813 A1 | 9/2011 | Baldemair et al. |
| 2011/0222631 A1 | 9/2011 | Jong |
| 2011/0227664 A1 | 9/2011 | Wyville |
| 2011/0243202 A1 | 10/2011 | Lakkis |
| 2011/0250858 A1 | 10/2011 | Jain et al. |
| 2011/0254639 A1 | 10/2011 | Tsutsumi et al. |
| 2011/0256857 A1 | 10/2011 | Chen et al. |
| 2011/0268232 A1 | 11/2011 | Park et al. |
| 2011/0311067 A1 | 12/2011 | Harris et al. |
| 2011/0319044 A1 | 12/2011 | Bornazyan |
| 2012/0021153 A1 | 1/2012 | Bhandari et al. |
| 2012/0052892 A1 | 3/2012 | Braithwaite |
| 2012/0063369 A1 | 3/2012 | Lin et al. |
| 2012/0063373 A1 | 3/2012 | Chincholi et al. |
| 2012/0140685 A1 | 6/2012 | Lederer et al. |
| 2012/0147790 A1 | 6/2012 | Khojastepour et al. |
| 2012/0154249 A1 | 6/2012 | Khojastepour et al. |
| 2012/0155335 A1 | 6/2012 | Khojastepour et al. |
| 2012/0155336 A1 | 6/2012 | Khojastepour et al. |
| 2012/0201153 A1 | 8/2012 | Bharadia et al. |
| 2012/0201173 A1 | 8/2012 | Jain et al. |
| 2012/0224497 A1 | 9/2012 | Lindoff et al. |
| 2013/0005284 A1 | 1/2013 | Dalipi |
| 2013/0044791 A1 | 2/2013 | Rimini et al. |
| 2013/0076433 A1 | 3/2013 | Fratti |
| 2013/0089009 A1 | 4/2013 | Li et al. |
| 2013/0102254 A1 | 4/2013 | Cyzs et al. |
| 2013/0114468 A1 | 5/2013 | Hui et al. |
| 2013/0155913 A1 | 6/2013 | Sarca |
| 2013/0166259 A1 | 6/2013 | Weber et al. |
| 2013/0194984 A1 | 8/2013 | Cheng et al. |
| 2013/0215805 A1 | 8/2013 | Hong et al. |
| 2013/0225101 A1 | 8/2013 | Basaran et al. |
| 2013/0253917 A1 | 9/2013 | Schildbach |
| 2013/0259343 A1 | 10/2013 | Liu et al. |
| 2013/0273871 A1 | 10/2013 | Kravets |
| 2013/0286903 A1 | 10/2013 | Khojastepour et al. |
| 2013/0294523 A1 | 11/2013 | Rossato et al. |
| 2013/0301487 A1 | 11/2013 | Khandani |
| 2013/0301488 A1 | 11/2013 | Hong et al. |
| 2013/0308717 A1 | 11/2013 | Maltsev et al. |
| 2013/0315211 A1 | 11/2013 | Balan et al. |
| 2014/0011461 A1 | 1/2014 | Bakalski et al. |
| 2014/0016515 A1 | 1/2014 | Jana et al. |
| 2014/0126437 A1 | 5/2014 | Patil et al. |
| 2014/0169236 A1 | 6/2014 | Choi et al. |
| 2014/0185533 A1 | 7/2014 | Haub |
| 2014/0206300 A1 | 7/2014 | Hahn et al. |
| 2014/0219139 A1 | 8/2014 | Choi et al. |
| 2014/0219449 A1 | 8/2014 | Shattil et al. |
| 2014/0313946 A1 | 10/2014 | Azadet |
| 2014/0348018 A1 * | 11/2014 | Bharadia ............... H04L 5/1461 370/252 |
| 2014/0348032 A1 | 11/2014 | Hua et al. |
| 2014/0376416 A1 | 12/2014 | Choi |
| 2015/0009868 A1 | 1/2015 | Jana et al. |
| 2015/0049834 A1 | 2/2015 | Choi et al. |
| 2015/0139122 A1 | 5/2015 | Rimini et al. |

(56) References Cited

U.S. PATENT DOCUMENTS

| | | |
|---|---|---|
| 2015/0146765 A1 | 5/2015 | Moffatt et al. |
| 2015/0156003 A1 | 6/2015 | Khandani |
| 2015/0156004 A1 | 6/2015 | Khandani |
| 2015/0171903 A1 | 6/2015 | Mehlman et al. |
| 2015/0188646 A1 | 7/2015 | Bharadia et al. |
| 2015/0215937 A1 | 7/2015 | Khandani |
| 2015/0249444 A1 | 9/2015 | Shin et al. |
| 2015/0270865 A1 | 9/2015 | Polydoros et al. |
| 2015/0303984 A1 | 10/2015 | Braithwaite |
| 2016/0036582 A1 | 2/2016 | Jana et al. |
| 2016/0218769 A1 | 7/2016 | Chang et al. |
| 2016/0226653 A1* | 8/2016 | Bharadia ............... H04B 1/525 |
| 2016/0266245 A1 | 9/2016 | Bharadia et al. |
| 2016/0380799 A1 | 12/2016 | Chang et al. |
| 2017/0019190 A1 | 1/2017 | Pack et al. |
| 2017/0041165 A1 | 2/2017 | Cheng et al. |
| 2017/0104506 A1 | 4/2017 | Liu et al. |
| 2017/0141886 A1 | 5/2017 | Chung et al. |
| 2017/0180160 A1 | 6/2017 | Moorti et al. |
| 2018/0013466 A1 | 1/2018 | Kim et al. |

FOREIGN PATENT DOCUMENTS

| | | |
|---|---|---|
| EP | 0755141 A3 | 10/1998 |
| EP | 1959625 B1 | 2/2009 |
| EP | 2237434 A1 | 10/2010 |
| EP | 2267946 A2 | 12/2010 |
| JP | 2001196994 A | 7/2001 |
| JP | 2003148748 A | 5/2003 |
| JP | 2012021153 A | 2/2012 |
| RU | 2256985 C2 | 7/2005 |
| WO | 2013173250 A1 | 11/2013 |
| WO | 2013185106 A1 | 12/2013 |
| WO | 2014093916 A1 | 6/2014 |

OTHER PUBLICATIONS

Hua, Yingbo, et al., "Full Duplex Radios", SIGOMM, Aug. 12-16, 2013, Hong Kong, China, Copyright 2013 ACM 978-1-4503-2056-6/6/13/08, 12 pages, Aug. 12, 2013.

Riihonen, Taneli, et al., "Mitigation of Loopback Self-Interference in Full-Duplex MIMO Relays", EEE Transactions on Signal Processing, vol. 59, No. 12, Dec. 1, 2011.

Shenghong, Li, et al., "Full-Duplex Wireless Communication Using Transmitter Output Based Echo Cancellation", EEE Globecom 2011, Dec. 5, 2011, Dec. 5, 2011.

* cited by examiner

SYSTEMS AND METHODS FOR ADAPTIVELY-TUNED DIGITAL SELF-INTERFERENCE CANCELLATION

CROSS-REFERENCE TO RELATED APPLICATIONS

This application is a continuation of U.S. patent application Ser. No. 15/648,332, filed 12 Jul. 2017, which is a continuation of U.S. patent application Ser. No. 15/362,289, filed on 28 Nov. 2016, which claims the benefit of U.S. Provisional Application Ser. No. 62/268,388, filed on 16 Dec. 2015, all of which are incorporated in their entireties by this reference.

TECHNICAL FIELD

This invention relates generally to the wireless communications field, and more specifically to new and useful systems and methods for adaptively-tuned digital self-interference cancellation.

BACKGROUND

Traditional wireless communication systems are half-duplex; that is, they are not capable of transmitting and receiving signals simultaneously on a single wireless communications channel. Recent work in the wireless communications field has led to advancements in developing full-duplex wireless communications systems; these systems, if implemented successfully, could provide enormous benefit to the wireless communications field. For example, the use of full-duplex communications by cellular networks could cut spectrum needs in half. One major roadblock to successful implementation of full-duplex communications is the problem of self-interference. While progress has been made in this area, many of the solutions intended to address self-interference fall short in performance, especially when tuning digital self-interference cancellation systems. Thus, there is a need in the wireless communications field to create new and useful systems and methods for adaptively-tuned digital self-interference cancellation. This invention provides such new and useful systems and methods.

DESCRIPTION OF THE PREFERRED EMBODIMENTS

Figure 1:
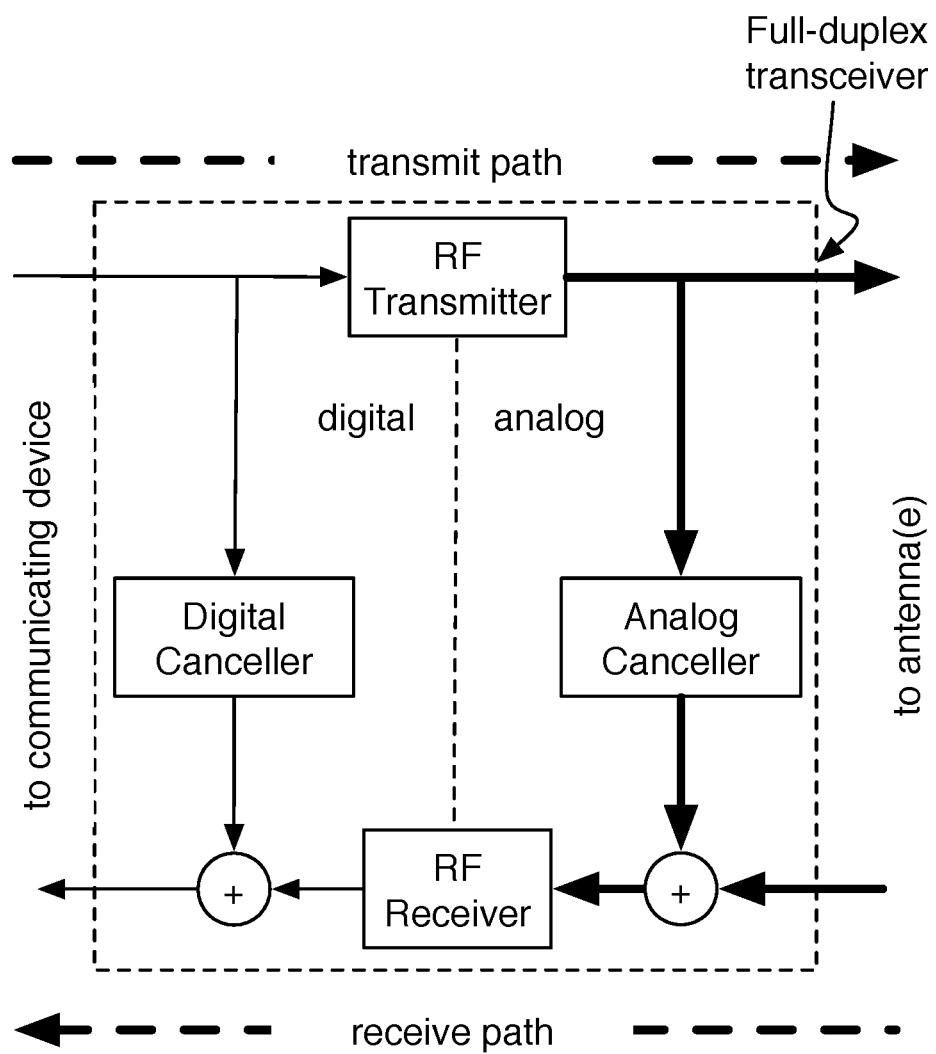
FIG. 1 is a schematic representation of a full-duplex transceiver.

The following description of the preferred embodiments of the invention is not intended to limit the invention to these preferred embodiments, but rather to enable any person skilled in the art to make and use this invention.

1. Full-duplex Wireless Communication Systems

Wireless communications systems have revolutionized the way the world communicates, and the rapid growth of communication using such systems has provided increased economic and educational opportunity across all regions and industries. Unfortunately, the wireless spectrum required for communication is a finite resource, and the rapid growth in wireless communications has also made the availability of this resource ever scarcer. As a result, spectral efficiency has become increasingly important to wireless communications systems.

One promising solution for increasing spectral efficiency is found in full-duplex wireless communications systems; that is, wireless communications systems that are able to transmit and receive wireless signals at the same time on the same wireless channel. This technology allows for a doubling of spectral efficiency compared to standard half-duplex wireless communications systems.

While full-duplex wireless communications systems have substantial value to the wireless communications field, such systems have been known to face challenges due to self-interference; because reception and transmission occur at the same time on the same channel, the received signal at a full-duplex transceiver may include undesired signal components from the signal being transmitted from that transceiver. As a result, full-duplex wireless communications systems often include analog and/or digital self-interference cancellation circuits to reduce self-interference.

Full-duplex transceivers preferably sample transmission output as baseband digital signals, intermediate frequency (IF) analog signals, or as radio-frequency (RF) analog signals, but full-duplex transceivers may additionally or alternatively sample transmission output in any suitable manner. This sampled transmission output may be used by full-duplex transceivers to remove interference from received wireless communications data (e.g., as RF/IF analog signals or baseband digital signals). In many full-duplex transceivers, an analog self-interference cancellation system is paired with a digital self-interference cancellation system.

The analog cancellation system removes a first portion of self-interference by summing delayed and scaled versions of the RF transmit signal to create an RF self-interference cancellation signal, which is then subtracted from the RF receive signal. Alternatively, the analog cancellation system may perform similar tasks at an intermediate frequency. After the RF (or IF) receive signal has the RF/IF self-interference cancellation signal subtracted, it passes through an analog-to-digital converter of the receiver (and becomes a digital receive signal). After this stage, a digital self-interference cancellation signal (created by transforming a digital transmit signal) is then subtracted from the digital receive signal.

Full-duplex transceivers often include tuning systems that adjust tunable parameters of the analog self-interference cancellation system in order to adapt the analog self-interference cancellation signal to changing self-interference conditions. Likewise, full-duplex transceivers may similarly include tuning systems that alter the transform configuration of digital self-interference cancellation systems for the same purpose.

Well-tuned digital and analog self-interference cancellation systems are generally effective for reducing interference, but tuning in these systems is often a time-consuming process. This poses a problem: the longer a system takes to retune, the more likely it is that the system will be unable to adapt to rapidly changing self-interference characteristics. Consequently, the usefulness of full-duplex transceivers may be limited.

The systems and methods described herein increase tuning performance of full-duplex transceivers as shown in FIG. 1 (and other applicable systems) by performing digital self-interference canceller tuning, thus allowing for increased effectiveness in self-interference cancellation. Other applicable systems include active sensing systems (e.g., RADAR), wired communications systems, wireless communications systems, and/or any other suitable system, including communications systems where transmit and receive bands are close in frequency, but not overlapping.

2. System for Adaptively-tuned Digital Self-interference Cancellation

Figure 2:
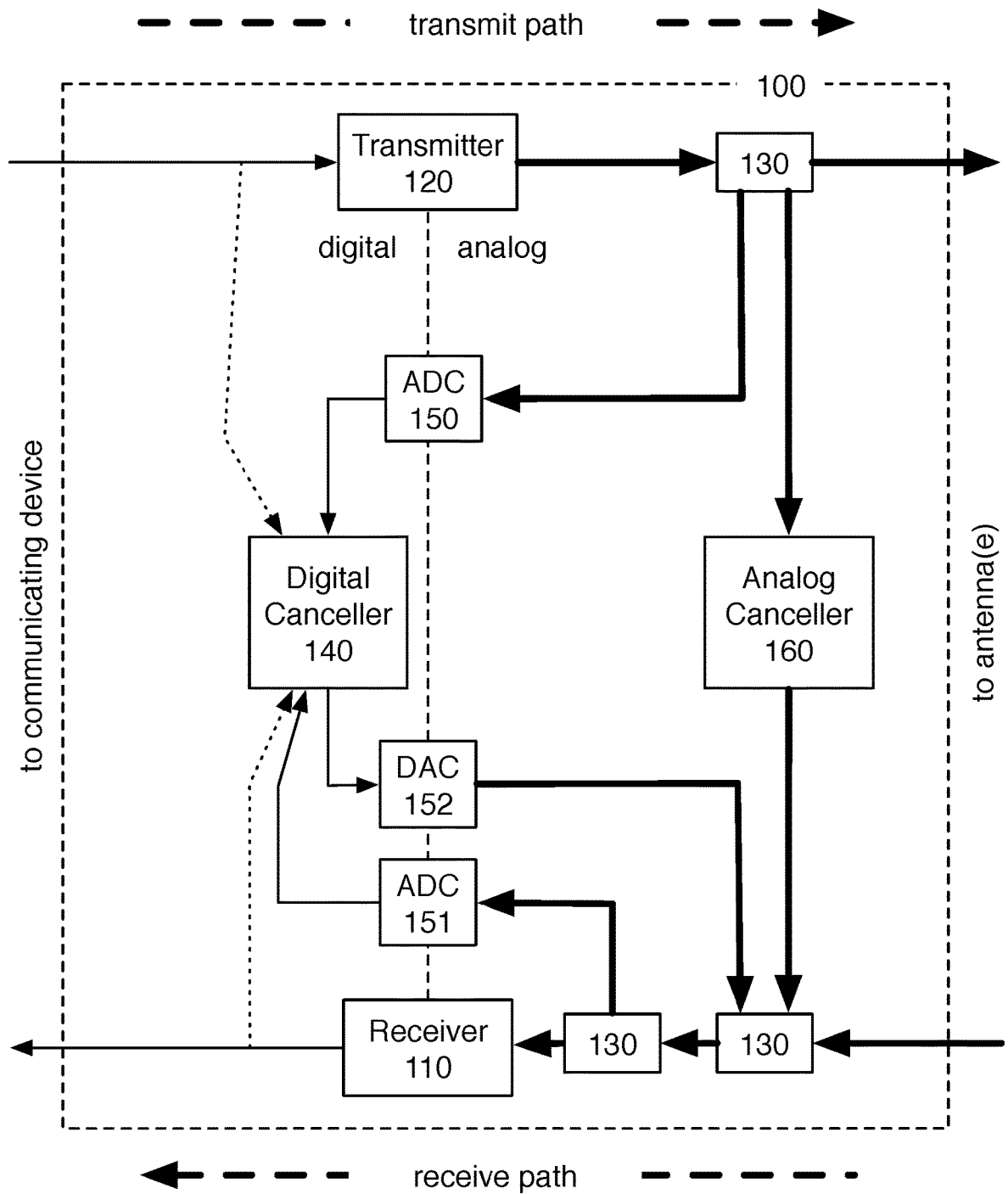
FIG. 2 is a diagram representation of a system of a preferred embodiment.

As shown in FIG. 2, a system 100 for adaptively-tuned digital self-interference cancellation includes a receiver 110, a transmitter 120, a signal coupler 130, a digital self-interference canceller 140, analog-to-digital converters (ADCs) 150 and 151, a digital-to-analog converter (DAC) 152, and an analog canceller 160.

The system 100 functions to increase the performance of self-interference cancellation by performing digital self-interference canceller tuning intelligently based on both transmit signal input and residue signal input. Transmit signal input is used to identify components of a transmit signal likely to be reflected in received self-interference, while residue signal input is used to determine the effects of self-interference cancellation.

The system 100 is preferably implemented using both digital and analog circuitry. Digital circuitry is preferably implemented using a general-purpose processor, a digital signal processor, an application specific integrated circuit (ASIC), a field programmable gate array (FPGA) and/or any suitable processor(s) or circuit(s). Analog circuitry is preferably implemented using analog integrated circuits (ICs) but may additionally or alternatively be implemented using discrete components (e.g., capacitors, resistors, transistors), wires, transmission lines, waveguides, digital components, mixed-signal components, or any other suitable components. The system 100 preferably includes memory to store configuration data, but may additionally or alternatively be configured using externally stored configuration data or in any suitable manner.

The receiver 110 functions to receive analog receive signals transmitted over a communications link (e.g., a wireless channel, a coaxial cable). The receiver no preferably converts analog receive signals into digital receive signals for processing by a communications system, but may additionally or alternatively not convert analog receive signals (passing them through directly without conversion).

The receiver 110 is preferably a radio-frequency (RF) receiver, but may additionally or alternatively be any suitable receiver.

The receiver 110 is preferably coupled to the communications link by a duplexer-coupled RF antenna, but may additionally or alternatively be coupled to the communications link in any suitable manner. Some examples of alternative couplings include coupling via one or more dedicated receive antennas. In another alternative coupling, the receiver 110 may be coupled to the communications link by a circulator-coupled RF antenna.

Figure 3:
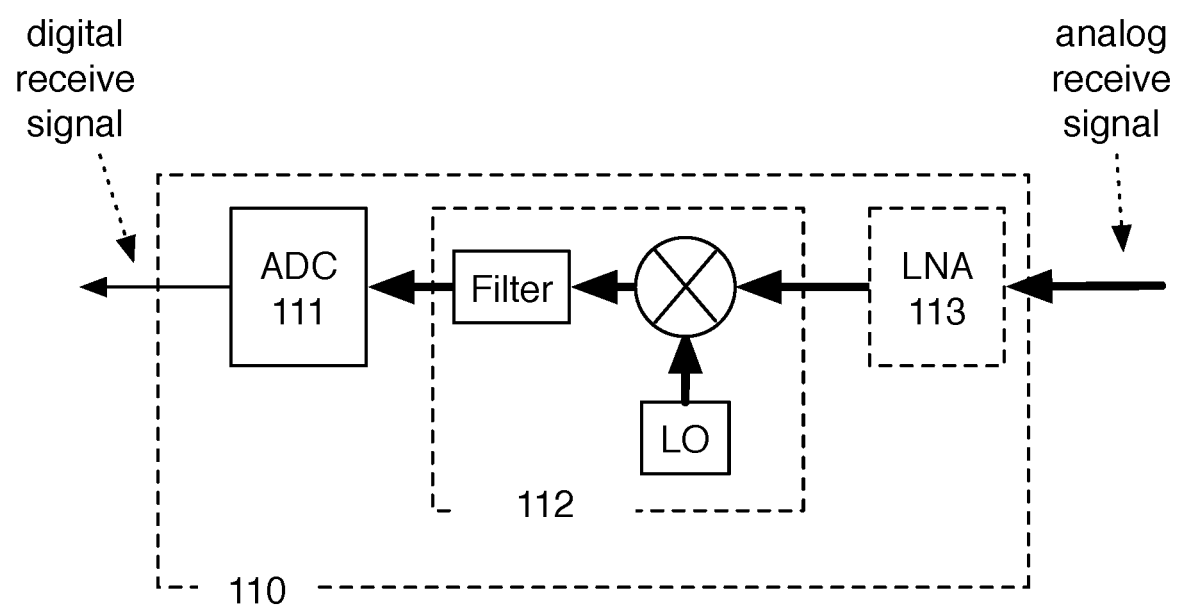
FIG. 3 is a diagram representation of a receiver of a system of a preferred embodiment.

The receiver no preferably includes an analog-to-digital converter (ADC) in and a frequency downconverter 112, as shown in FIG. 3. The receiver no may additionally include a low-noise amplifier 113. The receiver no may additionally or alternatively include amplifiers, filters, signal processors and/or any other suitable components. In one variation of a preferred embodiment, the receiver 110 includes only analog processing circuitry (e.g., amplifiers, filters, attenuators, delayers). The receiver may function to scale, shift, and/or otherwise modify the receive signal. The downconverter 112 functions to downconvert the analog receive signal from RF (or any other suitable frequency) to a baseband analog receive signal, and the analog-to-digital converter (ADC) in functions to convert the baseband analog receive signal to a digital receive signal.

The ADC 111 may be any suitable analog-to-digital converter; e.g., a direct-conversion ADC, a flash ADC, a successive-approximation ADC, a ramp-compare ADC, a Wilkinson ADC, an integrating ADC, a delta-encoded ADC, a time-interleaved ADC, or any other suitable type of ADC.

The frequency downconverter 112 functions to downconvert the carrier frequency of the analog receive signal to baseband, preparing it for conversion to a digital receive signal. The downconverter 112 preferably accomplishes signal downconversion using heterodyning methods, but may additionally or alternatively use any suitable downconversion methods.

The downconverter 112 preferably includes a local oscillator (LO), a mixer, and a baseband filter. The local oscillator functions to provide a frequency shift signal to the mixer; the mixer combines the frequency shift signal and the analog receive signal to create (usually two) frequency shifted signals, one of which is the baseband signal, and the baseband filter rejects signals other than the baseband analog receive signal.

The local oscillator is preferably a digital crystal variable-frequency oscillator (VFO) but may additionally or alternatively be an analog VFO or any other suitable type of oscillator. The local oscillator preferably has a tunable oscillation frequency but may additionally or alternatively have a static oscillation frequency.

The mixer is preferably an active mixer, but may additionally or alternatively be a passive mixer. The mixer may comprise discrete components, analog ICs, digital ICs, and/or any other suitable components. The mixer preferably functions to combine two or more electrical input signals into one or more composite outputs, where each output includes some characteristics of at least two input signals.

The baseband filter is preferably a lowpass filter with a tunable low-pass frequency. Additionally or alternatively, the baseband filter may be a lowpass filter with a set low-pass frequency, or any other suitable type of filter. The baseband filter is preferably a passive filter, but may additionally or alternatively be an active filter. The baseband filter is preferably implemented with analog circuit components, but may additionally or alternatively be digitally implemented.

The transmitter 120 functions to transmit signals of the communications system over a communications link to a second communications system. The transmitter 120 preferably converts digital transmit signals into analog transmit signals.

The transmitter 120 is preferably a radio-frequency (RF) transmitter, but may additionally or alternatively be any suitable transmitter.

The transmitter 120 is preferably coupled to the communications link by a duplexer-coupled RF antenna, but may additionally or alternatively be coupled to the communications link in any suitable manner. Some examples of alternative couplings include coupling via one or more dedicated transmit antennas. In another alternative coupling, the transmitter 120 may be coupled to the communications link by a duplexer-coupled RF antenna.

Figure 4:
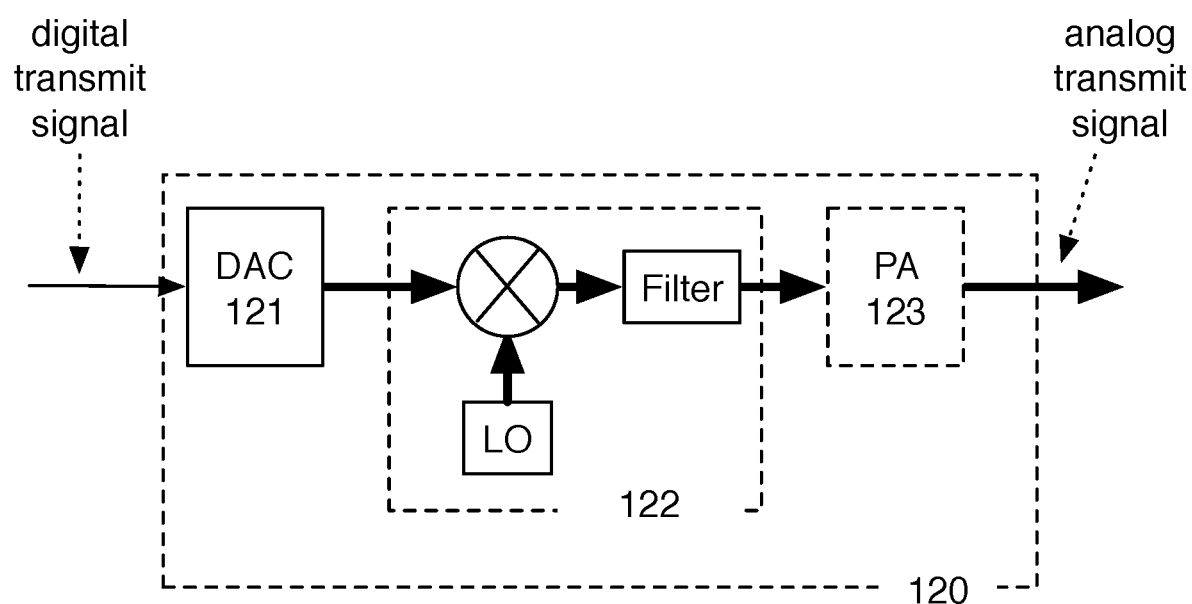
FIG. 4 is a diagram representation of a transmitter of a system of a preferred embodiment.

The transmitter 120 preferably includes a digital-to-analog converter (DAC) 121 and a frequency upconverter 122, as shown in FIG. 4. The transmitter 120 may additionally include a power amplifier 123. The transmitter 120 may additionally or alternatively include amplifiers, filters, signal processors and/or any other suitable components. The transmitter 120 may function to scale, shift, and/or otherwise modify the transmit signal. The digital-to-analog converter (DAC) 121 functions to convert the digital transmit signal to a baseband analog transmit signal, and the upconverter 122 functions to upconvert the baseband analog transmit signal from baseband to RF (or any other intended transmission frequency).

The DAC 121 may be any suitable digital-to-analog converter; e.g., a pulse-width modulator, an oversampling DAC, a binary-weighted DAC, an R-2R ladder DAC, a cyclic DAC, a thermometer-coded DAC, or a hybrid DAC.

The frequency upconverter 122 functions to upconvert the carrier frequency of the baseband analog transmit signal to a radio frequency, preparing it for transmission over the communications link. The upconverter 122 preferably accomplishes signal upconversion using heterodyning methods, but may additionally or alternatively use any suitable upconversion methods.

The upconverter 122 preferably includes a local oscillator (LO), a mixer, and an RF filter. The local oscillator functions to provide a frequency shift signal to the mixer; the mixer combines the frequency shift signal and the baseband analog transmit signal to create (usually two) frequency shifted signals, one of which is the RF analog transmit signal, and the RF filter rejects signals other than the RF analog transmit signal.

The local oscillator is preferably a digital crystal variable-frequency oscillator (VFO) but may additionally or alternatively be an analog VFO or any other suitable type of oscillator. The local oscillator preferably has a tunable oscillation frequency but may additionally or alternatively have a static oscillation frequency.

The mixer is preferably an active mixer, but may additionally or alternatively be a passive mixer. The mixer may comprise discrete components, analog ICs, digital ICs, and/or any other suitable components. The mixer preferably functions to combine two or more electrical input signals into one or more composite outputs, where each output includes some characteristics of at least two input signals.

The RF filter is preferably a bandpass filter centered around a tunable radio frequency. Additionally or alternatively, the RF filter may be a bandpass filter centered around a set radio frequency, or any other suitable type of filter. The RF filter is preferably a passive filter, but may additionally or alternatively be an active filter. The RF filter is preferably implemented with analog circuit components, but may additionally or alternatively be digitally implemented.

Figure 5A:
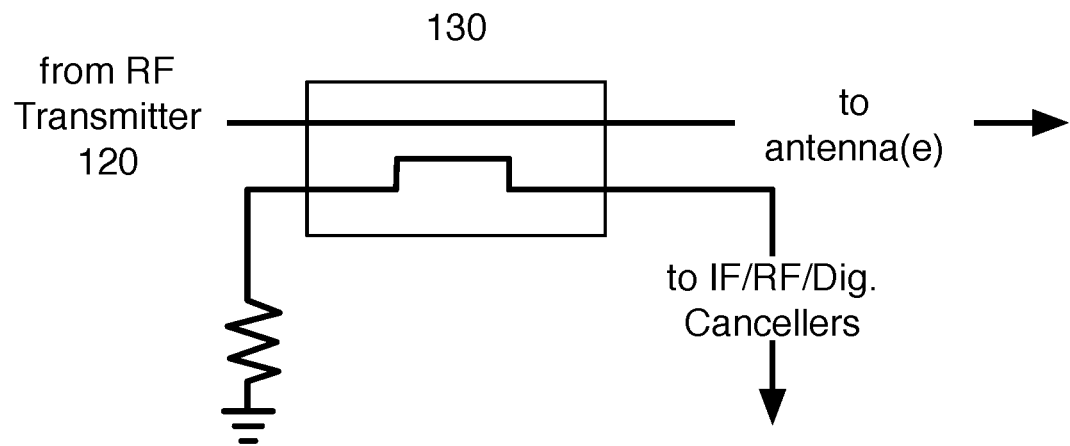
FIGS. 5A and 5B are diagram representations of signal couplers of a system of a preferred embodiment.
Figure 5B:
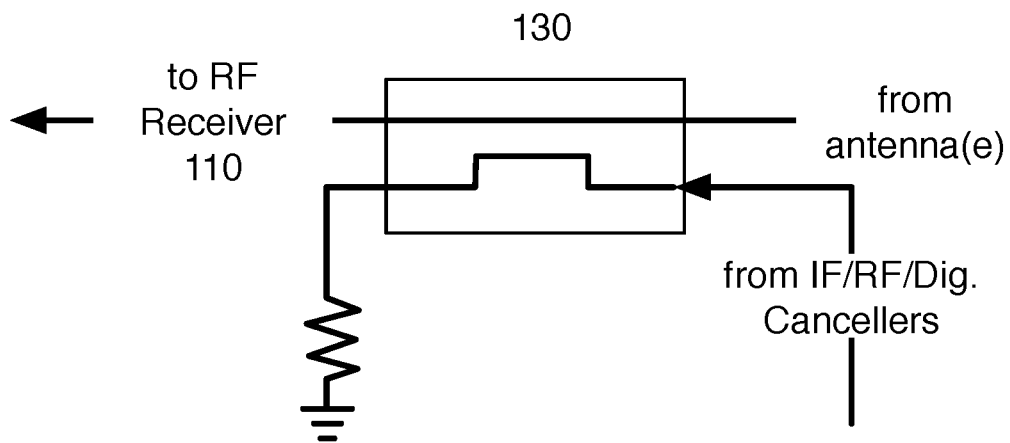

The signal coupler 130, as shown in FIGS. 5A and 5B, functions to allow signals to be split and/or joined. The signal coupler 130 may be used to provide a sample of the analog transmit signal for the digital canceller 140 and/or analog cancellers 160, as shown in FIG. 5A; that is, the signal coupler 130 may serve as a transmit coupler. The signal coupler 130 may also be used to combine one or more analog self-interference cancellation signals (from analog/digital cancellers) with the analog receive signal, as shown in FIG. 5B; that is, the signal coupler 130 may serve as a receive coupler. Additionally or alternatively, the signal coupler 130 may be used for any other purpose. For example, as shown in FIG. 2, a signal coupler 130 may be used to provide a sample of a residue signal (in this case, an analog receive signal that has already been combined with analog and digitally-sourced self-interference cancellation signals) to the digital canceller 140.

If the signal coupler 130 is used as a transmit coupler (which is assumed for the remainder of this section), the signal coupler 130 is preferably directly coupled to the transmitter 120, but may additionally or alternatively be coupled indirectly to the transmitter 120 and/or be coupled to another suitable RF transmission source. The signal coupler 130 preferably has at least two outputs; one coupled to antenna(e) (directly or indirectly) and another coupled to one or more of the digital canceller 140 and the analog canceller 160. The signal coupler 130 preferably routes the majority of input power to the antenna(e) output port, but may additionally or alternatively route power in any suitable manner (e.g., routing the majority of power to other output ports). The signal coupler 130 may have any number of input and output ports, including bidirectional input/output ports.

If the signal coupler 130 is used as a receive coupler (which is assumed for the remainder of this section), the receive coupler is preferably coupled directly to the receiver 110, but may additionally or alternatively be coupled indirectly to the receiver 110 and/or be coupled to another suitable RF receiver. The signal coupler 130 preferably has at least two inputs, one coupled to antenna(e) of the full-duplex radio (directly or indirectly) and another coupled to one or more of the digital canceller 140 and the analog canceller 160. The signal coupler 130 preferably couples the majority of power from both input ports to the receiver output port; this coupling preferably results in the receiver output port outputting a sum of one or more self-interference cancellation signals (generated by 140/160) and the RF receive signal (received at the antenna(e)). Additionally or alternatively, the signal coupler 130 may couple or route power in any suitable manner. The signal coupler 130 may have any number of input and output ports, including bidirectional input/output ports.

The signal coupler 130 is preferably a short section directional transmission line coupler, but may additionally or alternatively be any power divider, power combiner, directional coupler, or other type of signal splitter. The signal coupler 130 is preferably a passive coupler, but may additionally or alternatively be an active coupler (for instance, including power amplifiers). For example, the signal coupler 130 may comprise a coupled transmission line coupler, a branch-line coupler, a Lange coupler, a Wilkinson power divider, a hybrid coupler, a hybrid ring coupler, a multiple output divider, a waveguide directional coupler, a waveguide power coupler, a hybrid transformer coupler, a cross-connected transformer coupler, a resistive tee, and/or a resistive bridge hybrid coupler. The output ports of the signal coupler 130 are preferably phase-shifted by ninety degrees, but may additionally or alternatively be in phase or phase shifted by a different amount.

The system 100 preferably includes at least two signal couplers 130 (e.g., a transmit and a receive coupler); these signal couplers 130 preferably connect to a single antenna through a duplexer or circulator, but may additionally or alternatively connect to multiple antennae. In one example, the transmit coupler and receive coupler connect to two separate antennae (e.g., a transmit antenna and a receive antenna); in another example, the transmit coupler and receive coupler both connect to the same two antennae. The transmit coupler and receive coupler may additionally or alternatively connect to any suitable RF transmit and RF receive sources (e.g., an RF signal transmitted solely over coaxial cable). There may additionally or alternatively be filters, power amplifiers, and/or any other RF signal modifying components between the couplers 130 and antennae.

The digital self-interference canceller 140 functions to produce a digital self-interference cancellation signal from a digital transmit signal. The digital self-interference cancellation signal is preferably converted to an analog self-interference cancellation signal (by the DAC 152) and combined with one or more analog self-interference cancellation signals to further reduce self-interference present in the RF receive signal at the receiver 110. Additionally or alternatively, the digital self-interference cancellation signal may be combined with a digital receive signal (e.g., after the receiver 110), such as shown by way of example in FIGS. 19A and/or 19B.

The digital self-interference canceller 140 preferably samples the RF transmit signal of the transmitter 120 using the ADC 150 (additionally or alternatively, the canceller 140 may sample the digital transmit signal or any other suitable transmit signal) and transforms the sampled and converted RF (or IF) transmit signal to a digital self-interference signal based on a digital transform configuration. The digital transform configuration preferably includes settings that dictate how the digital self-interference canceller 140 transforms the digital transmit signal to a digital self-interference signal (e.g. coefficients of a generalized memory polynomial used to transform the transmit signal to a self-interference signal).

Note that the digital self-interference canceller 140 may be coupled to any transmit and/or receive signals (either as input to the canceller or as outputs of the canceller), as described in U.S. patent application Ser. No. 14/569,354, the entirety of which is incorporated by this reference. For example, the digital self-interference canceller may take as input an RF-sourced intermediate frequency (IF) transmit signal (e.g., the transmit signal is converted to RF by the transmitter 120, then downconverted to IF by a downconverter, then passed through the ADC 150 to the digital canceller 140) or may output at IF (e.g., the digital self-interference cancellation signal is converted to a digitally-sourced IF self-interference cancellation signal, and is then combined with an IF self-interference cancellation signal at IF, before the combined self-interference cancellation signal is converted to RF and combined with an RF receive signal).

The digital self-interference canceller 140 may be implemented using a general-purpose processor, a digital signal processor, an application specific integrated circuit (ASIC), a field programmable gate array (FPGA) and/or any suitable processor(s) or circuit(s). The digital self-interference canceller 140 preferably includes memory to store configuration data, but may additionally or alternatively be configured using externally stored configuration data or in any suitable manner.

Figure 6:
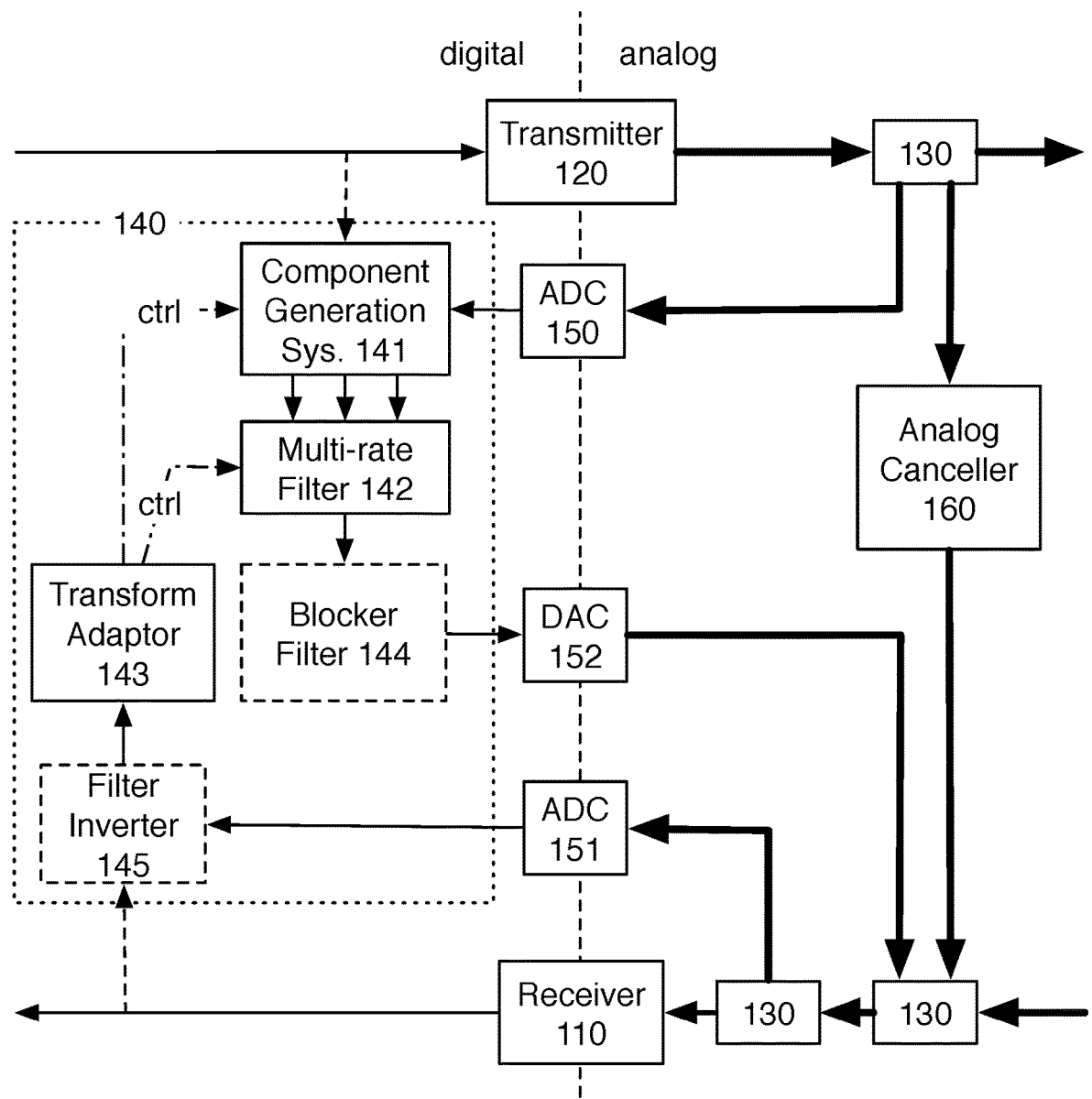
FIG. 6 is a diagram representation of a system of a preferred embodiment.

In one implementation of a preferred embodiment, the digital self-interference canceller 140 includes a component generation system 141, a multi-rate filter 142, and a transform adaptor 143, as shown in FIG. 6. The digital self-interference canceller 140 may additionally or alternatively include a blocker filter 144, and/or a filter inverter 145.

The component generation system 141 functions to generate a set of signal components from the sampled transmit signal (or signals) that may be used by the multi-rate filter 142 to generate a self-interference cancellation signal.

The component generation system 141 preferably samples digital transmit signals corresponding to a native sampling rate. Additionally or alternatively, the component generation system 141 may sample a subset of digital transmit signal data; for instance, if a digital transmit signal has a native sample rate of 40 MHz, the component generation system 141 might discard every other sample, corresponding to a sample rate of 20 MHz (while the RF transmitter may still receive all samples, corresponding to a sample rate of 40 MHz). The component generation system 141 may additionally or alternatively interpolate digital transmit signals to increase or decrease sampling rate. In one instance, the component generation system 141 modifies the sampling rate of a digital transmit signal to match a sampling rate of an RF receiver of a full-duplex radio.

In sampling the digital transmit data, the component generation system 141 may perform pre-processing to prepare sampled digital transmit signals for component generation. The component generation system 141 may include various operators for pre-processing such as scaling, shifting, and/or otherwise modifying the digital transmit signals.

In one implementation, the component generation system 141 modifies sampled digital transmit signals by removing information unlikely to substantially affect the output of the multi-rate filter 142. This may include, for instance, dropping samples if the samples do not represent a change above some change threshold from previous samples. As another example, if digital transmit signals correspond to a particular amplitude of an output analog signal, only digital signal data corresponding to an amplitude above some amplitude threshold (or a power above some power threshold) may be passed to the multi-rate filter 142.

If the component generation system 141 receives digital transmit signals from more than one source (e.g. from both the digital transmit line before the RF transmitter and the analog transmit line after the RF transmitter via an ADC), the component generation system 141 may additionally or alternatively combine the signals in any suitable way or may select one signal over another. For instance, the component generation system 141 may pass the average of the two signals to the multi-rate filter 142. As another example, the component generation system 141 may prefer an RF-sourced digital transmit signal (e.g., from the ADC 150) over the transmit-path digital transmit signal (e.g., sampled before conversion by the transmitter 120) above a certain transmitter power, and vice versa at or below that transmitter power. The selection and combination of the two (or more) signals may be dependent on any suitable condition.

The component generation system 141 preferably generates a set of signal components that may be weighted and combined by the multi-rate filter 142 in order to generate a self-interference cancellation signal. The self-interference cancellation signal is based upon a hypothesized contribution of self-interference to a received signal. Self-interference contributions may result from a variety of sources, including components in both RF receivers and RF transmitters of full-duplex radios (e.g., mixers, power amplifiers, ADCs, DACs, etc.). Further, self-interference contributions may vary randomly, or with environmental or input conditions (e.g. transmission power, ambient temperature, etc.).

The component generation system 141 preferably generates transmit signal components according to mathematical models adapted to model self-interference contributions of the RF transmitter, RF receiver, and/or other sources. The component generation system 141 preferably generates a set of signal components intended to be used with a specific mathematical model (e.g., generalized memory polynomial (GMP) models, Volterra models, and Wiener-Hammerstein models); additionally or alternatively, the signal component generation system may generate a set of signal components usable with multiple mathematical models.

Signal component sets may additionally or alternatively be chosen based on comparisons of sampled digital transmit signals to received signals (from the receive path or any other suitable source). Signal component sets may be generated from previously known models or may be created using neural network and/or machine learning techniques.

For example, a general form of a GMP model is as follows:

$$\sum_k c_{n,k} x[n]|x[n]|^{k-1} +$$
$$\sum_k c_{n,k} x[n]|x[n-m-l]|^{k-1} + \sum_k c_{nk} x[n]|x[n-m+l]|^{k-1}$$

where the input signal is represented by x[n] and $c_{nk}$ represents coefficients of the GMP. The first sum of the GMP captures self-interference effects occurring based on current values of the input signal, while the second two terms capture self-interference effects determined by past values of the input signal (known as memory effects).

A component generation system 141 configured to generate a signal component set according to this GMP model might generate signal components by output order; for example, a first signal component might simply be x[n], while a second signal component may be x[n]|x[n]| (or alternatively, $|x[n]|^2$), a third signal component may be $x[n]|x[n]|^2$, and so on. Such a signal component set might have N components (the Nth component represented as $x[n]|x[n]|^{N-1}$ when N is odd and $|x[n]|^N$ when N is even, where N is an integer).

For mathematical models that do use higher order terms, the bandwidth of terms of order k are generally k times larger than the bandwidth of the input signal; for example, if an input signal x[n] has a bandwidth of 40 MHz, the third order terms (e.g., $x[n]|x[n-m]|^2$) will occupy a bandwidth of 120 MHz. To avoid issues arising from aliasing, the input signal is preferably sampled at a sampling rate of 120 MHz (three times more than an initial Nyquist sampling rate of 40 MHz). As the number of terms increase, so does the ability to model non-linear self-interference effects, but so also does the minimum sampling rate to avoid aliasing. This presents another issue; the RF transmitter may also have to match this increased sampling rate in order to subtract non-linear digital interference signals from received signals. For example, if a GMP model uses $7^{th}$ order terms, for the same 40 MHz transmit signal the RF receiver may have to sample the received signal at a rate of 280 MHz to avoid aliasing issues (and likewise, the transmit signal may have to be sampled at the same rate).

Figure 7:
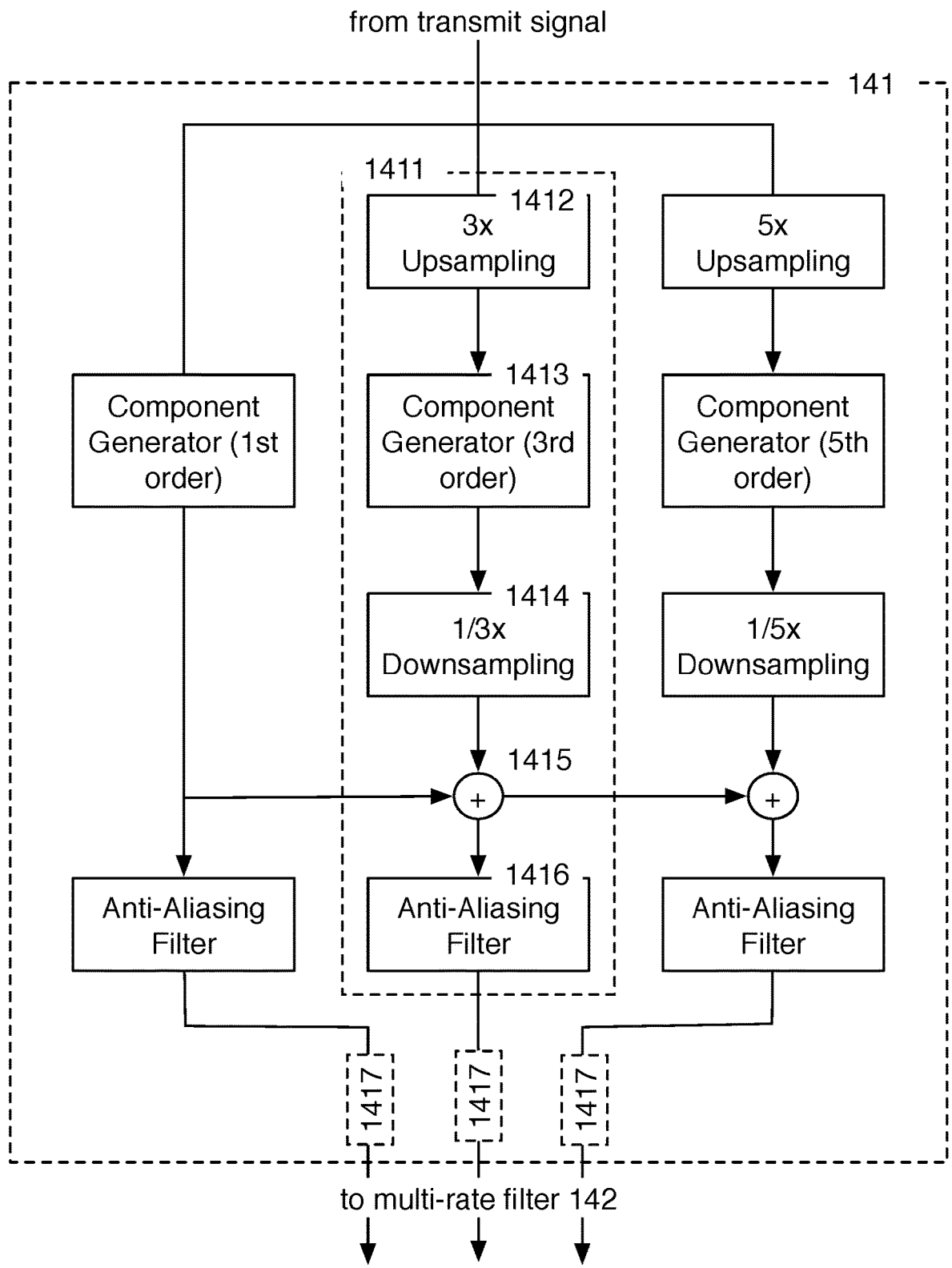
FIG. 7 is a diagram representation of a component generation system of a system of a preferred embodiment.

In one embodiment of the invention, the component generation system 141 addresses these issues by separating components at least partially according to component order (e.g., one component containing x[n] terms, another component containing $x[n]|x[n-m]|^2$ terms). The preferred result of this separation is that the sampling rate necessary for each model component to avoid aliasing is known as a function of component order. In this embodiment, the component generation system 141 includes a number of transform paths 1411, each of which may include an upsampler 1412, a component generator 1413, a downsampler 1414, a signal combiner 1415, and/or an anti-aliasing filter (AAF) 1416, as shown in FIG. 7.

When a digital transmit signal is passed to a transform path 1411, the transform path 1411 may first upsample the digital transmit signal by passing it to the upsampler 1412.

The upsampler 1412 functions to increase the number of samples contained within the digital transmit signal in order to reduce aliasing effects. Note that for first order signal components, upsampling may not be necessary. The upsampler 1412 preferably increases the number of samples contained within a digital transmit signal component according to linear interpolation, but may additionally or alternatively use any suitable method. In one example, the upsampler 1412 upsamples a digital transmit signal component by creating a sequence comprising the original samples separated by L-1 zeroes (where L is the upsampling factor) and then passing the new signal through a finite impulse response (FIR) lowpass filter. In another example, the upsampler 1412 creates a sequence comprising the original samples separated from each other by L-1 new samples, where each new sample is modeled on how a DAC converts digital samples to an analog signal (e.g. if the output of the DAC is not exactly linear between outputs). For a transform path 1411 (and component generator 1413) of order k, the upsampler 1412 preferably upsamples the digital transmit signal with an upsampling factor of k, but may additionally or alternatively upsample the digital transmit signal by any suitable factor.

The component generator 1413 functions to create the transmit signal component desired for a particular transform path 1411. For example, a signal component generated for order 3 of a GMP model might be generated as $$x[n]|x[n]|^2 + x[n]|x[n-m]|^2$$

The component generator 1413 preferably generates signal components of a single order only, but may additionally or alternatively generate components of multiple orders (e.g., $x[n]|x[n]|^2 + x[n]|x[n]|^4$). The component generator 1413 preferably generates signal components according to a generalized memory polynomial (GMP) model, Volterra model, Wiener-Hammerstein model, or neural network model, but may additionally or alternatively use a part or whole of any suitable model or combination of models.

In some cases, the component generator 1413 may simply pass a copy of a sampled transmit signal unmodified; this may be considered functionally equivalent to a component generator 1413 not being explicitly included for that particular transform path 1411. This may be alternatively referred to as a first order component generator.

The downsampler 1414 functions to reduce the number of samples contained within a signal component generated by a component generator 1413. The downsampler 1414 preferably downsamples signal components by simply removing signals at a particular interval (e.g., throwing away every other sample to halve the number of samples) but may additionally or alternatively downsample signal components by any suitable method. The downsampler 1414 preferably downsamples signal components to match the sampling rate of the received digital baseband signal, but may additionally or alternatively downsample signal components to any suitable sampling rate.

Note that sampling rates of transform path 1411 inputs and outputs need not necessarily be equal to each other; likewise, sampling rates across transform paths 1411 need not necessarily be equal. The system 100 preferably includes performing self-interference cancellation at multiple sampling rates (i.e., multi-rate self-interference cancellation).

The signal combiner 1415 functions to allow for combination of signal components. The signal combiner 1415 preferably performs weighted signal combination (e.g., Output Signal=Transform Path Signal+0.2*Multiplier Input Signal), but may additionally or alternatively combine signal components in any suitable manner. The signal combiner 1415 may be located at any point within a transform path 1415 and may take any signals as input.

In a variation of a preferred embodiment, the component generation system 141 does not include any signal combiners 1415.

The anti-aliasing filter (AAF) 1416 functions to reduce the bandwidth of signal components to prepare the signal components for processing by the multi-rate adaptive filter 142. The AAF 1416 is preferably a digitally implemented FIR lowpass filter, but may additionally or alternatively be any suitable type of filter (e.g., infinite impulse response (IIR) filters, fourier-transform based filters). The AAF 1416 preferably reduces the bandwidth of signal components to match the bandwidth of the digital baseband signal received from the RF transmitter, but may additionally or alternatively function to cap the bandwidth of signal components at any value below the maximum bandwidth of all signal components produced by component generators 1413. The AAF 1416 preferably functions to remove non-linear interference signal components not found in the received baseband signal (e.g., if the RF receiver has a corresponding lowpass filter for the baseband analog or digital signals or potentially a corresponding bandpass filter for the RF signal).

In a variation of a preferred embodiment, the signal component generation system includes one or more frequency shifters 1417. The frequency shifters 1417 function to shift the frequency of signal components. Frequency shifting is preferably performed by multiplying the input signal with $e^{-j\omega n}$ where n is the digital sample and $\omega$ is a frequency of the band in which self-interference cancellation is to be performed. By shifting the operating frequency of the signal components, interference signals that are present in other frequency bands (e.g., adjacent and/or close to the transmit frequency band) can be estimated and removed from the signal. Similarly to signal combiners 1415, frequency shifters 1417 may be located at any point within a transform path 1411.

The signal component generation system 141 preferably transmits signal components without combining them to the multi-rate adaptive filter 142 (aside from combination resulting from signal combiners 1415); additionally or alternatively, signal components may be added, averaged, and/or combined in any suitable manner (e.g. scaling components before adding them and/or combining components multiplicatively).

The multi-rate adaptive filter 142 functions to generate a self-interference cancellation signal from the signal components produced by the component generation system 141. In some implementations, the multi-rate adaptive filter 142 may additionally function to perform sampling rate conversions (a la the upsampler 1412 and/or downsampler 1414).

The multi-rate adaptive filter 142 preferably generates a self-interference cancellation signal by combining a weighted sum of signal components according to mathematical models adapted to model self-interference contributions of the RF transmitter, RF receiver, and/or other sources. Examples of mathematical models that may be used by the multi-rate adaptive filter 142 include generalized memory polynomial (GMP) models, Volterra models, and Wiener-Hammerstein models; the multi-rate adaptive filter 142 may additionally or alternatively use any combination or set of models.

The multi-rate adaptive filter 142 may additionally or alternatively use generated mathematical models for modeling self-interference contributions based on comparisons of sampled digital transmit signals to received signals (from the receive path or any other suitable source). These models may be generated from previously known models or may be created using neural network and/or machine learning techniques.

The multi-rate adaptive filter 142 preferably performs self-interference cancellation signal generation according to a transform configuration set dynamically by the transform adaptor 143 (discussed in more detail in sections covering the transform adaptor 143). Additionally or alternatively, the multi-rate adaptive filter may combine signal components in any manner in order to generate a self-interference cancellation signal.

Figure 8:
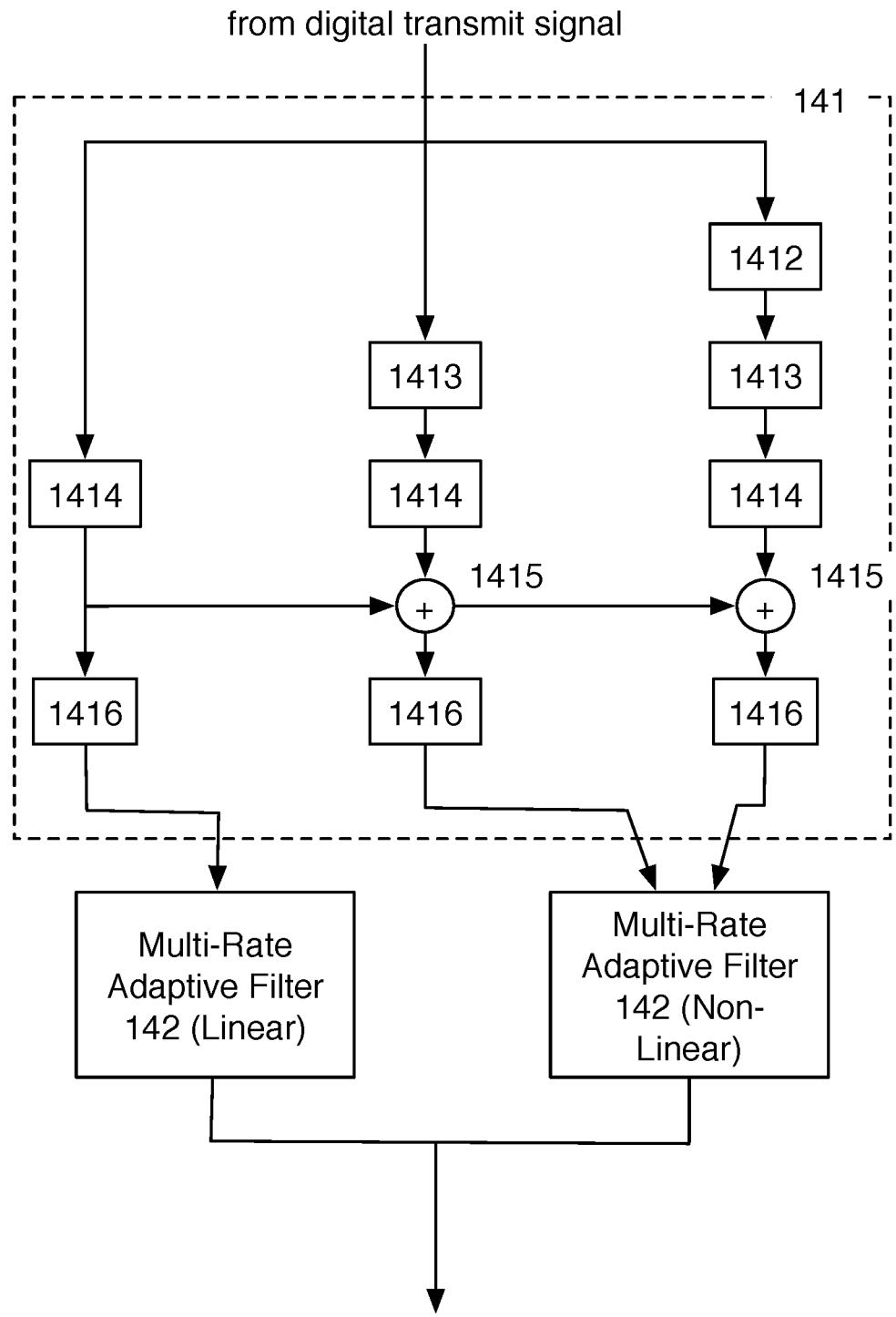
FIG. 8 is a diagram representation of a digital self-interference canceller of a system of a preferred embodiment.

The digital self-interference canceller 140 preferably includes a single multi-rate adaptive filter 142, but may additionally or alternatively include multiple multi-rate adaptive filters 142. For example, the digital self-interference canceller 140 may include one multi-rate adaptive filter 142 for linear self-interference cancellation and one for non-linear self-interference cancellation, as shown in FIG. 8. Signal components may be transmitted to multiple multi-rate adaptive filters 142 in any manner (including some or all signal components going to multiple multi-rate adaptive filters 142).

If the canceller 140 includes multiple multi-rate adaptive filters 142, the output of these filters may be combined in any manner to generate a self-interference cancellation signal.

The transform adaptor 143 functions to set the transform configuration of the multi-rate adaptive filter 142. The transform adaptor 143 may additionally or alternatively set configuration of the signal component generation system 141.

The transform configuration preferably includes the type of model or models used by the multi-rate adaptive filter 142 as well as configuration details pertaining to the models (each individual model is a model type paired with a particular set of configuration details). For example, one transform configuration might set the multi-rate adaptive filter 142 to use a GMP model with a particular set of coefficients. If the model type is static, the transform configuration may simply include model configuration details; for example, if the model is always a GMP model, the transform configuration may include only coefficients for the model, and not data designating the model type.

The transform configuration may additionally or alternatively include other configuration details related to the signal component generation system 141 and/or the multi-rate adaptive filter 142. For example, if the signal component generation system 141 includes multiple transform paths 1411, the transform adaptor 143 may set the number of these transform paths 1411, which model order their respective component generators 1413 correspond to, the type of filtering used by AAFs 1416, and/or any other suitable details. In general, the transform configuration may include any details relating to the computation or structure of the signal component generation system 141 and/or the multi-rate adaptive filter 142.

Transform configurations are preferably selected and/or generated by the transform adaptor 143. The transform adaptor 143 may set an appropriate transform configuration by selecting from stored static configurations, from generating configurations dynamically, or by any other suitable manner or combination of manners. For example, the transform adaptor 143 may choose from three static transform configurations based on their applicability to particular signal and/or environmental conditions (the first is appropriate for low transmitter power, the second for medium transmitter power, and the third for high transmitter power). As another example, the transform adaptor 143 may dynamically generate configurations based on signal and/or environmental conditions; the coefficients of a GMP model are set by a formula that takes transmitter power, temperature, and receiver power as input.

The transform adaptor 143 preferably sets transform configurations based on a variety of input data (whether transform configurations are selected from a set of static configurations or generated according to a formula or model). Input data used by the transform adaptor 143 may include static environmental and system data (e.g. receiver operating characteristics, transmitter operating characteristics, receiver elevation above sea-level), dynamic environmental and system data (e.g. current ambient temperature, current receiver temperature, average transmitter power, ambient humidity), and/or system configuration data (e.g. receiver/transmitter settings), signal data (e.g., digital transmit signal, RF transmit signal, RF receive signal, digital receive signal). The transform adaptor 143 may additionally or alternatively generate and/or use models based on this input data to set transform configurations; for example, a transmitter manufacturer may give a model to predict internal temperature of the transmitter based on transmitter power, and the transform adaptor 143 may use the output of this model (given transmitter power) as input data for setting transform configurations.

The transform adaptor 143 may set transform configurations at any time, but preferably sets transform configurations in response to either a time threshold or other input data threshold being crossed. For example, the transform adaptor 143 may re-set transform configurations every ten seconds according to changed input data values. As another example, the transform adaptor 143 may re-set transform configurations whenever transmitter power thresholds are crossed (e.g. whenever transmitter power increases by ten percent since the last transform configuration setting, or whenever transmitter power increases over some static value).

The transform adaptor 143 may cooperate with the analog canceller 160 (for instance, setting transform configurations based on data from the analog canceller 160, coordinating transform configuration setting times with the analog canceller 160, disabling or modifying operation of the analog canceller 160) to reduce overall self-interference (or for any other suitable reason).

The transform adapter 143 preferably adapts transform configurations and/or transform-configuration-generating algorithms (i.e., algorithms that dynamically generate transform configurations) to reduce self-interference for a given transmit signal and set of system/environmental conditions. The transform adapter 143 may adapt transform configurations and/or transform-configuration-generating algorithms using analytical methods, online gradient-descent methods (e.g., LMS, RLMS), and/or any other suitable methods. Adapting transform configurations preferably includes changing transform configurations based on learning. In the case of a neural-network model, this might include altering the structure and/or weights of a neural network based on test inputs. In the case of a GMP polynomial model, this might include optimizing GMP polynomial coefficients according to a gradient-descent method.

The transform adaptor 143 may adapt transform configurations based on test input scenarios (e.g. scenarios when the signal received by the RF receiver is known), scenarios where there is no input (e.g. the only signal received at the RF receiver is the signal transmitted by the RF transmitter), or scenarios where the received signal is unknown. In cases where the received signal is an unknown signal, the transform adaptor 143 may adapt transform configurations based on historical received data (e.g. what the signal looked like ten seconds ago) or any other suitable information. The transform adaptor 143 may additionally or alternatively adapt transform configurations based on the content of the transmitted signal; for instance, if the transmitted signal is modulated in a particular way, the transform adaptor 143 may look for that same modulation in the self-interference signal; more specifically, the transform adaptor 143 may adapt transform configurations such that when the self-interference signal is combined with the digital receive signal the remaining modulation (as an indicator of self-interference) is reduced (compared to a previous transform configuration).

The transform adaptor 143 may additionally or alternatively function to set tuning parameters for components outside of the digital self-interference canceller 140, particularly if those parameters are relevant to digital self-interference canceller performance and/or tuning.

The blocker filter 144 functions to remove unwanted higher order terms in the self-interference cancellation signal generated by the multi-rate adaptive filter 142. The blocker filter 144 may be especially useful in reducing unwanted signals not eliminated by the AAFs 1416. The blocker filter 144 is preferably a digitally implemented FIR lowpass filter, but may additionally or alternatively be any suitable type of filter (e.g., infinite impulse response (IIR) filters, fourier-transform based filters).

The blocker filter 144 output sample rate is preferably matched to the output sample rate of the blocker filter present in the RF transmitter 120 (where a blocker filter is standard). If the input sample rate of the blocker filter is not equal to the desired RF transmitter blocker filter sample rate, the blocker filter 144 may perform sample rate conversion in a substantially similar manner to the upsampler 1412 and/or the downsampler 1414.

The filter inverter 145 preferably functions to remove or reduce the effects of the blocker filter 144. The filter inverter 145 is preferably used to remove or reduce the effects of the blocker filter 144 on a residue signal sampled by the transform adaptor 143 (wherein the residue signal refers to the digital transmit signal after combination with the self-interference cancellation signal). The filter inverter 145 thus enables the transform adaptor 143 to perform optimization based upon the amount of self-interference that would remain without the contribution of the blocker filter (i.e., providing better data to tune upon). Use of the filter inverter 145 may result in substantially faster convergence of transform configuration parameters.

In a variation of a preferred embodiment, the filter inverter 145 may additionally or alternatively function to remove or reduce the effects of filters or components (other than the blocker filter) on the residue signal sampled by the transform adaptor 143. In some instances, it may be desirable to remove or reduce effects induced by the receiver of the communications system (or any other elements or components present in the signal path between the multi-rate adaptive filter 142 and the transform adaptor 143). As a specific example, when the digital self-interference cancellation signal is injected into the RF receive signal and the filter inverter 145 is coupled to the digital receive line (after the receiver 110), the filter inverter 145 may function to remove or reduce the effects of RF receiver components (e.g., distortions resulting from amplification and/or analog-to-digital conversion).

The digital self-interference canceller 140 may additionally or alternatively include gain/phase compensators that function to modify the gain and phase of either the digital receive signal or the digital self-interference cancellation signal such that the two signals are aligned in gain and phase. Gain/phase compensation thus enables the canceller 140 to compensate for gain and/or phase error induced by the receive chain (or other sources). Gain/phase correction values are preferably set by the transform adaptor 143, but may additionally or alternatively be set in any manner.

The ADC 150 functions to convert a transmit signal from an analog signal to a digital signal; this signal is hereafter referred to as a converted transmit signal. Alternatively, the signal post-conversion may be referred to as an RF-sourced digital transmit signal (assuming conversion from an RF transmit signal) or an IF-sourced digital transmit signal (assuming conversion from an IF transmit signal). The ADC 150 is preferably substantially similar to the ADC 111, but may additionally or alternatively be any suitable ADC.

Figure 9:
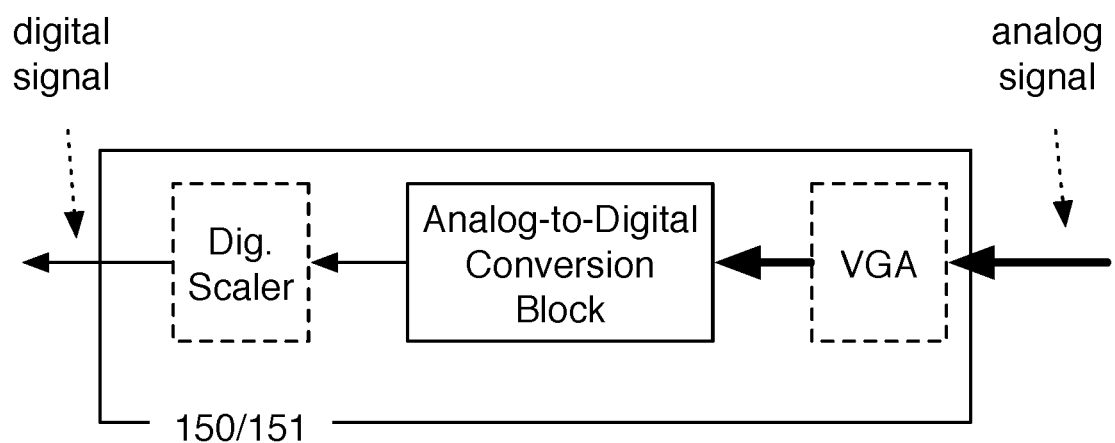
FIG. 9 is a diagram representation of an ADC of a system of a preferred embodiment.

In addition to analog-to-digital signal conversion, the ADC 150 may perform signal scaling (in either analog or digital domains) as well as frequency conversion (in either analog or digital domains) for input analog signals. In one implementation, the ADC 150 includes at least one of a variable-gain amplifier (VGA) and a digital scaler, as shown in FIG. 9. The variable-gain amplifier functions to scale an analog signal before conversion via the ADC 150, while the digital scaler functions to scale a digital signal after conversion via the ADC 150. Both the VGA and digital scaler are preferably capable of scaling signals with any complex multiplier (e.g., resulting in both amplitude and phase shift), but may additionally or alternatively be capable of scaling signals with a subset of the set of complex numbers. For example, a VGA may only be capable of scaling signals by a real number between 1 and 4.

The ADC 151 is preferably substantially similar to the ADC 150, except the ADC 151 functions to convert a receive signal from an analog signal to a digital signal. The ADC 151 preferably is used to sample a receive signal post-self-interference cancellation (i.e., a residue signal) to evaluate self-interference canceller 140/160 performance and/or aid in canceller tuning. Note that the system 100 may include multiple ADCs 151, and they may sample receive signals of the system 100 at any point. For example, the system 100 may include three ADCs 151; one coupled to a receive signal prior to any self-interference cancellation, one coupled to a receive signal after analog self-interference cancellation but prior to digital self-interference cancellation, and one coupled to the receive signal after both analog and digital self-interference cancellation. Likewise, one ADC 151 may couple to all three of those signals.

The DAC 152 functions to convert the digital self-interference cancellation signal from a digital signal to an analog signal; this signal is hereafter referred to as a converted digital self-interference cancellation signal. Alternatively, the signal post-conversion may be referred to as an digitally-sourced RF self-interference cancellation signal (assuming conversion to RF) or a digitally-sourced IF self-interference cancellation signal (assuming conversion to IF). The DAC 152 is preferably substantially similar to the DAC 121, but may additionally or alternatively be any suitable DAC.

Figure 10:
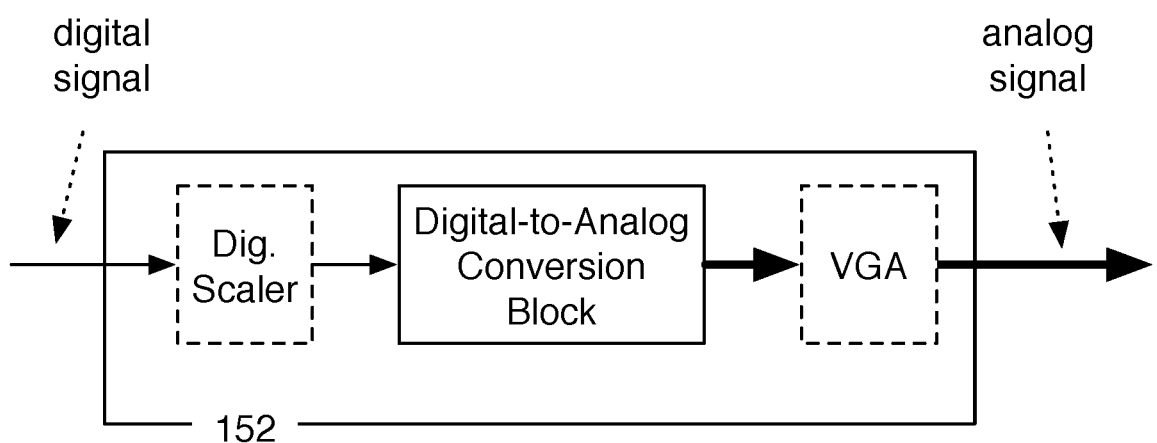
FIG. 10 is a diagram representation of a DAC of a system of a preferred embodiment.

In addition to digital-to-analog signal conversion, the DAC 152 may perform signal scaling (in either analog or digital domains) as well as frequency conversion (in either analog or digital domains) for input digital signals. In one implementation, the DAC 152 includes at least one of a variable-gain amplifier (VGA) and a digital scaler, as shown in FIG. 10. The digital scaler functions to scale a digital signal before conversion via the DAC 152, while the VGA functions to scale an analog signal after conversion via the DAC 152. Both the VGA and digital scaler are preferably capable of scaling signals with any complex multiplier (e.g., resulting in both amplitude and phase shift), but may additionally or alternatively be capable of scaling signals with a subset of the set of complex numbers. For example, a VGA may only be capable of scaling signals by a real number between 1 and 4.

VGAs and/or digital scalers of the ADCs 150/151 and the DAC 152 are preferably controlled by the transform adaptor 143. For example, the transform adaptor 143 could set the scale factor of a scaler (dig. scaler and/or VGA) of the DAC 152 based on the content and/or amplitude of a residue signal; e.g., the transform adaptor 142 may increase the gain of the DAC 152 output in order to lower self-interference present in the residue signal. As another example, the transform adaptor 143 could temporarily reduce the gain of the DAC 152 to 0 for tuning purposes (e.g., to establish a baseline level of cancellation in the residue signal, where the baseline level is set based solely on cancellation performed by the analog canceller 160). As a third example, the transform adaptor 143 could increase the gain of the ADC 151 in response to a low-amplitude residue signal (e.g., the ADC 151 VGA gain could be re-set to increase the likelihood that the signal is neither clipped nor lost in noise by the analog-to-digital conversion block).

The analog self-interference canceller 160 functions to to produce an analog self-interference cancellation signal from an analog transmit signal that can be combined with an analog receive signal to reduce self-interference present in the analog receive signal. The analog self-interference canceller 160 is preferably designed to operate at a single frequency band, but may additionally or alternatively be designed to operate at multiple frequency bands. The analog self-interference canceller 160 may include any of the circuits related to analog self-interference cancellation of U.S. patent application Ser. No. 14/569,354; e.g., the RF self-interference canceller, the IF self-interference canceller, associated up/downconverters, and/or tuning circuits.

The analog self-interference canceller 160 is preferably implemented as an analog circuit that transforms an analog transmit signal into an analog self-interference cancellation signal by combining a set of filtered, scaled, and/or delayed versions of the analog transmit signal, but may additionally or alternatively be implemented as any suitable circuit. For instance, the analog self-interference canceller 160 may perform a transformation involving only a single version or copy of the analog transmit signal. The transformed signal (the analog self-interference cancellation signal) preferably represents at least a part of the self-interference component received at the receiver.

The analog self-interference canceller 160 is preferably adaptable to changing self-interference parameters in addition to changes in the analog transmit signal; for example, transceiver temperature, ambient temperature, antenna configuration, humidity, and transmitter power. Adaptation of the analog self-interference canceller 160 is preferably performed by a tuning circuit, but may additionally or alternatively be performed by a control circuit or other control mechanism included in the canceller or any other suitable controller (e.g., by the transform adaptor 143).

In particular, the analog self-interference canceller 160 may be paused (e.g., generation of an analog self-interference cancellation signal may temporarily cease) or otherwise disabled by a tuning circuit or other controller (e.g., the transform adaptor 143). Alternatively, tuning of the analog self-interference canceller 160 may be paused (e.g., an iterative tuning process stopped, temporarily or otherwise).

Figure 11:
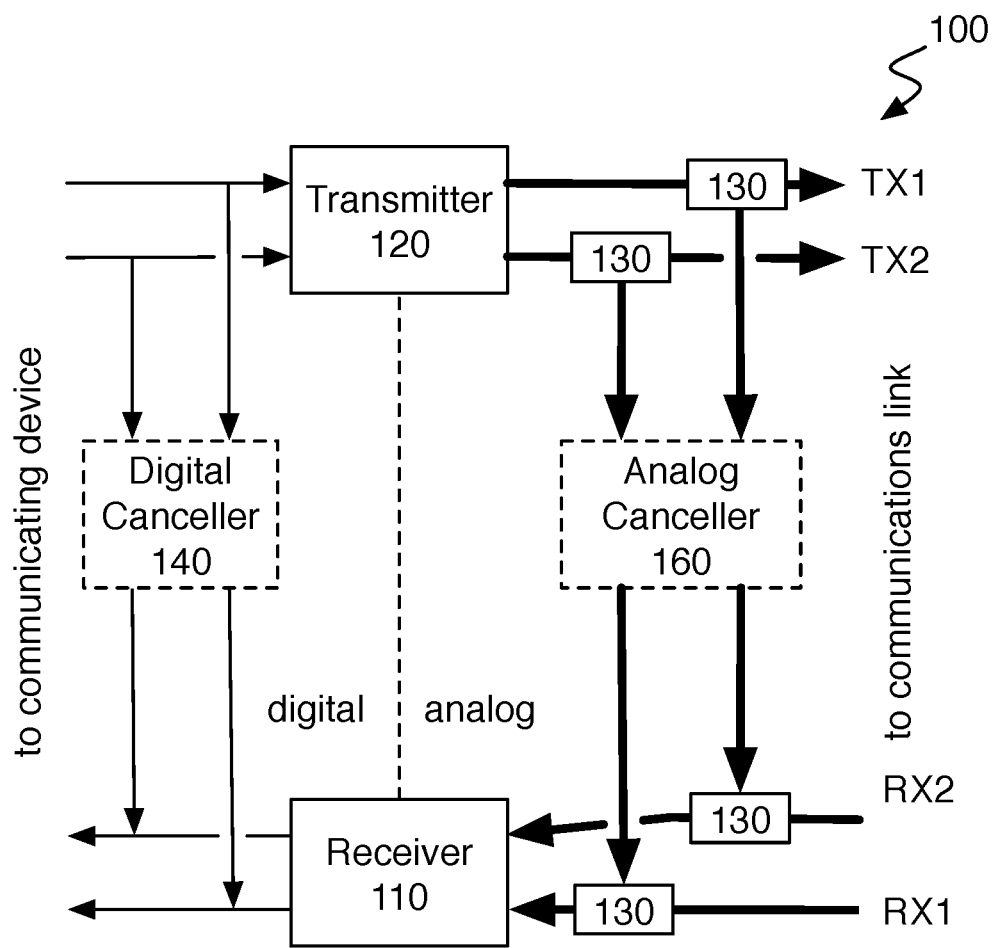
FIG. 11 is a diagram representation of a system of a preferred embodiment.

Note that while the preceding paragraphs primarily describe a SISO (single-input single-output) implementation of the system 100, the system 100 may additionally or alternatively be implemented as a MIMO (multiple-input, multiple-output) system (or MISO, SIMO, etc.). The system 100 may be a 2×2 MIMO system as shown in FIG. 11, but may additionally have any suitable number of transmit and receive signal paths. Each signal path may have separate antennas; alternatively, signal paths may share antennas via a duplexer or other coupler. In one example, a 2×2 MIMO system has four antennas: a TX1 antenna, a TX2 antenna, an RX1 antenna, and an RX2 antenna. In another example, a 2×2 MIMO system has two antennas: a TX1/RX1 antenna (coupled to both TX1 and RX1 signal paths via a duplexer) and a TX2/RX2 antenna (coupled to both TX2 and RX2 signal paths via a duplexer).

Note that while a particular configuration of input/output connections for the digital and analog cancellers 140 and 160 are shown in FIG. 11, any configuration of these inputs and outputs (e.g., using ADCs/DACs to couple the digital canceller to analog signals, including residue signals, as shown in FIG. 2) may be used.

In a MIMO implementation, the transmitter 120 preferably has multiple inputs and outputs. In particular, the transmitter 120 preferably includes a DAC and frequency upconverter for each transmit signal path; additionally or alternatively, transmit signal paths may share DACs and/or frequency upconverters. Additionally or alternatively, the transmitter 120 may be any suitable MIMO transmitter (or the system 100 may include multiple transmitters 120); for example, the transmitter 120 may include MIMO signal splitting or processing circuitry (which may be used to process a single digital signal into multiple MIMO analog signals).

Likewise, the receiver 110 preferably has multiple inputs and outputs. In particular, the receiver 110 preferably includes an ADC and frequency downconverter for each receive signal path; additionally or alternatively, receive signal paths may share ADCs and/or frequency downconverters. Additionally or alternatively, the receiver 110 may be any suitable MIMO receiver (or the system 100 may include multiple receivers 110); for example, the receiver 110 may include MIMO signal splitting or processing circuitry (which may be used to process a single digital signal into multiple MIMO analog signals).

Figure 12:
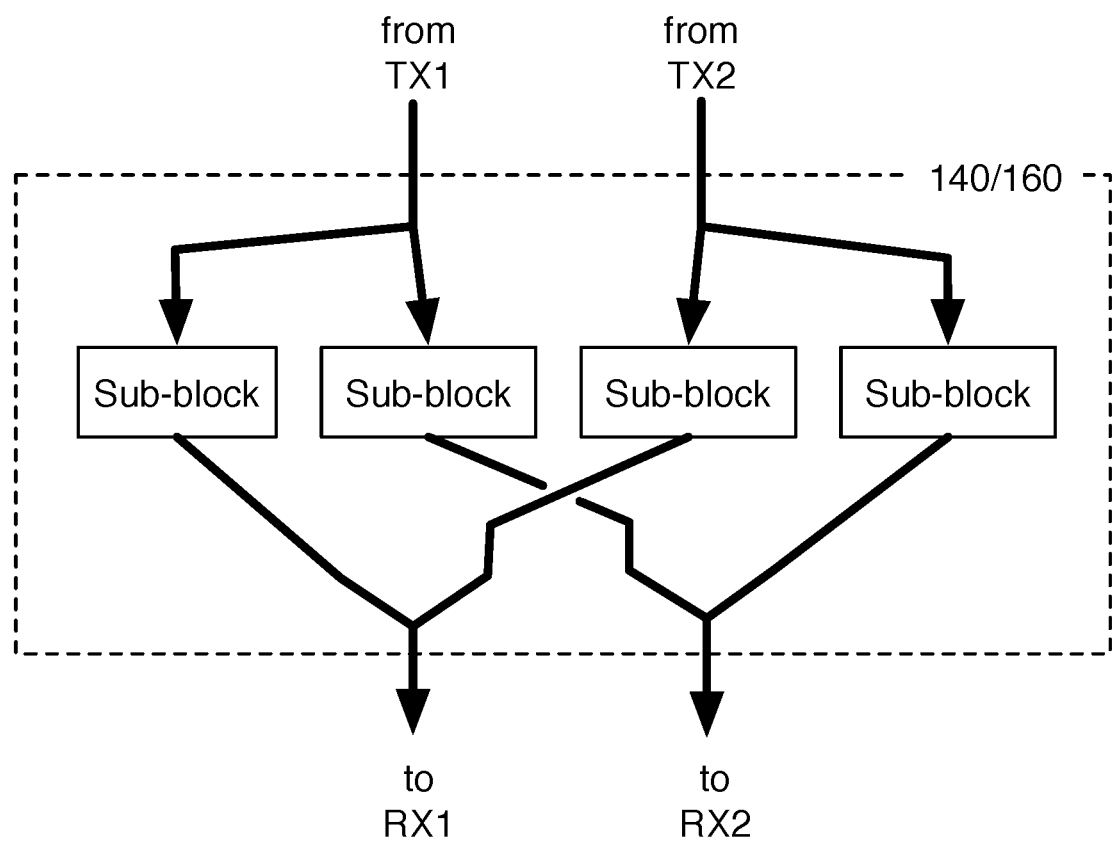
FIG. 12 is a diagram representation of a self-interference canceller of a system of a preferred embodiment.

In a MIMO implementation, the digital self-interference canceller 140 is preferably designed for MIMO operating environments (i.e., multiple transmit and/or receive signals). In MIMO operating environments, self-interference may occur across separate communications streams; for example, a TX1 signal may cause interference in both of RX1 and RX2 signals. The digital self-interference canceller 140 may include multiple cancellation sub-blocks (each incorporating some or all of the functionality of a SISO implementation of the digital self-interference canceller 140). For example, the digital self-interference canceller may include sub-blocks for each possible RX/TX pairing (e.g., RX1/TX1, RX1/TX2, etc.) as shown in FIG. 12. In this implementation, each sub-block functions to remove self-interference resulting from a particular pairing; e.g., an RX1/TX2 sub-block functions to remove self-interference in the RX1 receive signal resulting from the TX2 transmit signal.

Figure 13:
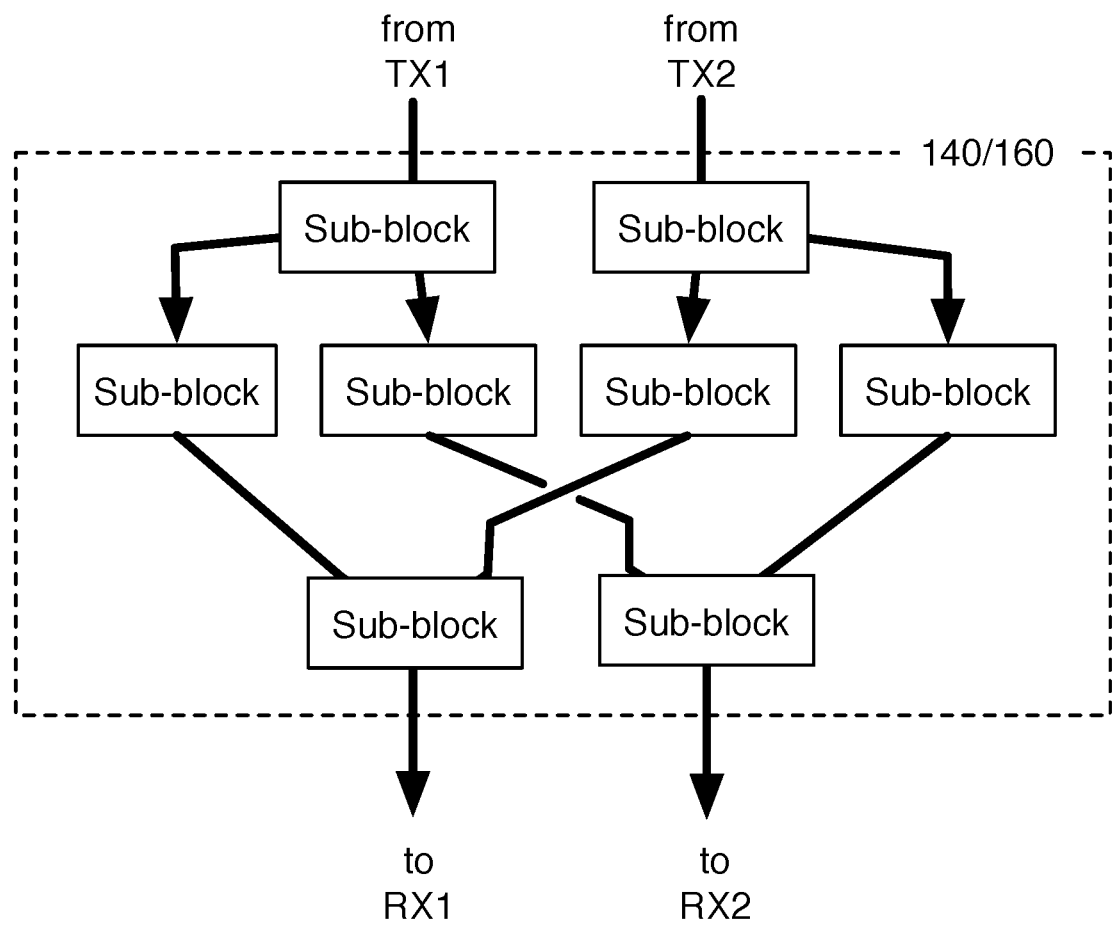
FIG. 13 is a diagram representation of a self-interference canceller of a system of a preferred embodiment.

In another implementation of a preferred embodiment, the digital self-interference canceller 140 conceptually splits the duties of self-interference reduction for each stream pairing into transmitter contributions, channel contributions, and receiver contributions. In this implementation, sub-blocks are provided for transmit streams, receive streams, and stream pairings, as shown in FIG. 13. Sub-blocks for transmit streams preferably remove self-interference contributions common to a particular transmitter across streams; sub-blocks for receive streams preferably remove self-interference contributions common to a particular receiver across streams; and sub-blocks for stream pairings preferably remove self-interference contributions unique to that particular stream pairing. Dividing self-interference cancellation duties in this way may prevent unnecessary duplication of function (e.g., by preventing each pairing of an RX stream with TX1 from duplicating self-interference contributions common to all pairings with TX1).

Similarly to the digital self-interference canceller 140, the analog self-interference canceller 160 (implemented in a MIMO system) may split analog self-interference cancellation duties into sub-blocks or sub-circuits as previously described.

2. Method for Adaptively-tuned Digital Self-interference Cancellation

Figure 14:
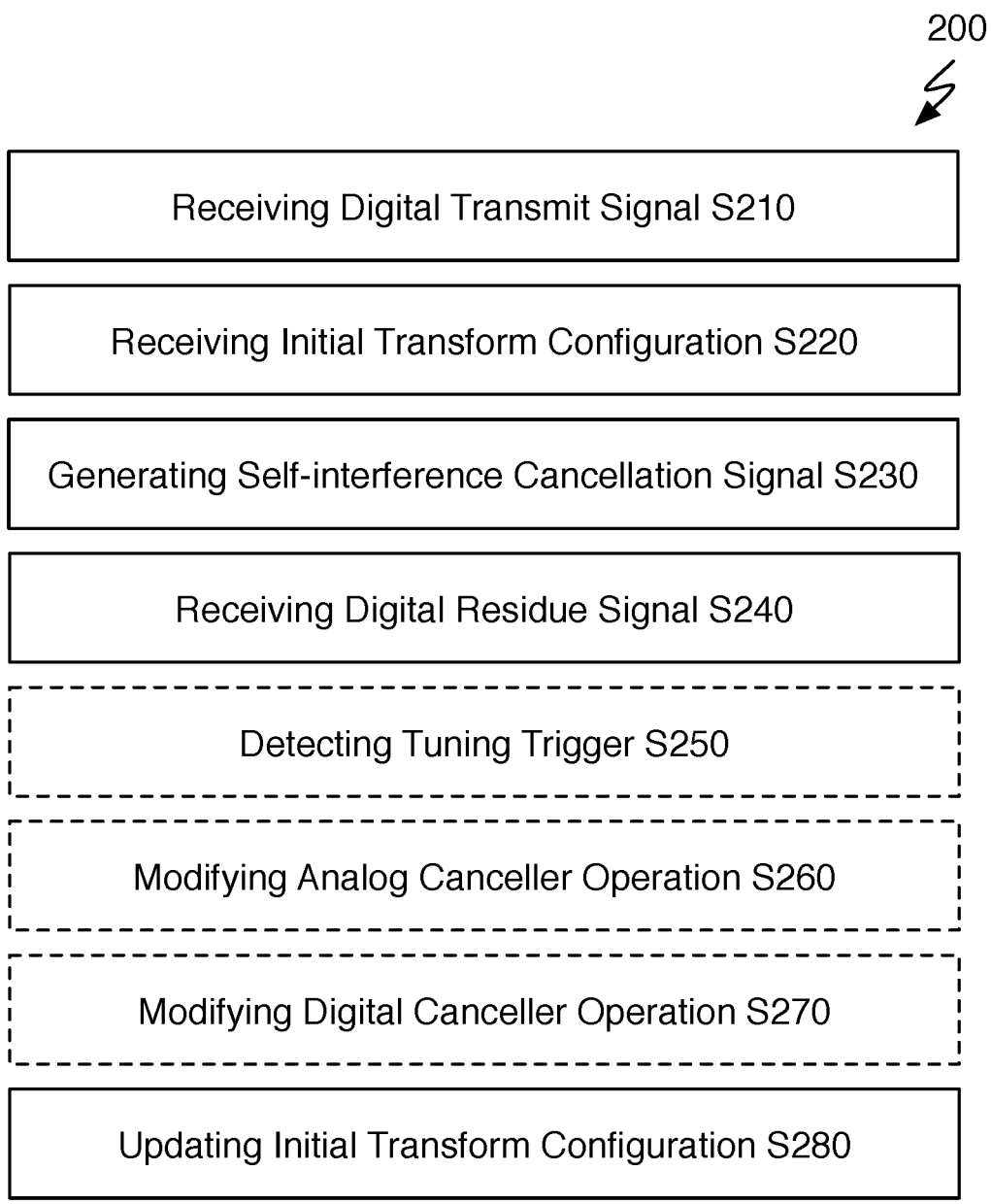
FIG. 14 is a chart representation of a method of a preferred embodiment.

As shown in FIG. 14, a method 200 for adaptively-tuned digital self-interference cancellation includes receiving a digital transmit signal S210, receiving an initial transform configuration S220, generating a digital self-interference cancellation signal S230, receiving a digital residue signal S240, and updating the initial transform configuration S280. The method 200 may additionally include detecting a tuning trigger S250, modifying analog canceller operation S260, and/or modifying digital canceller operation S270.

The method 200 provides a technique for operating and tuning a digital self-interference canceller of a self-interference cancellation system. The method 200 provides for a digital self-interference canceller to produce a digital self-interference cancellation signal (S230) from a digital transmit signal (received in S210) based upon an initial transform configuration (received in S220). The digital self-interference canceller (or other circuit/module) receives a residue signal to monitor performance of the canceller (S24). While the initial transform configuration may provide adequate self-interference cancellation signal generation ability at first, eventually (e.g., due to a tuning trigger received in S250) the digital self-interference canceller is retuned by updating the initial transform configuration (S280), which modifies how the digital transmit signal is transformed into a digital self-interference cancellation signal. Operation of the digital self-interference canceller (S270) and/or any coupled analog self-interference cancellers (S260) may be modified to collect more information from the residue signal (e.g., isolating contributions of one self-interference canceller), to optimize self-interference cancellation (e.g., gain-matching digital self-interference signal to self-interference components), or to aid tuning processes in any other manner.

Figure 15:
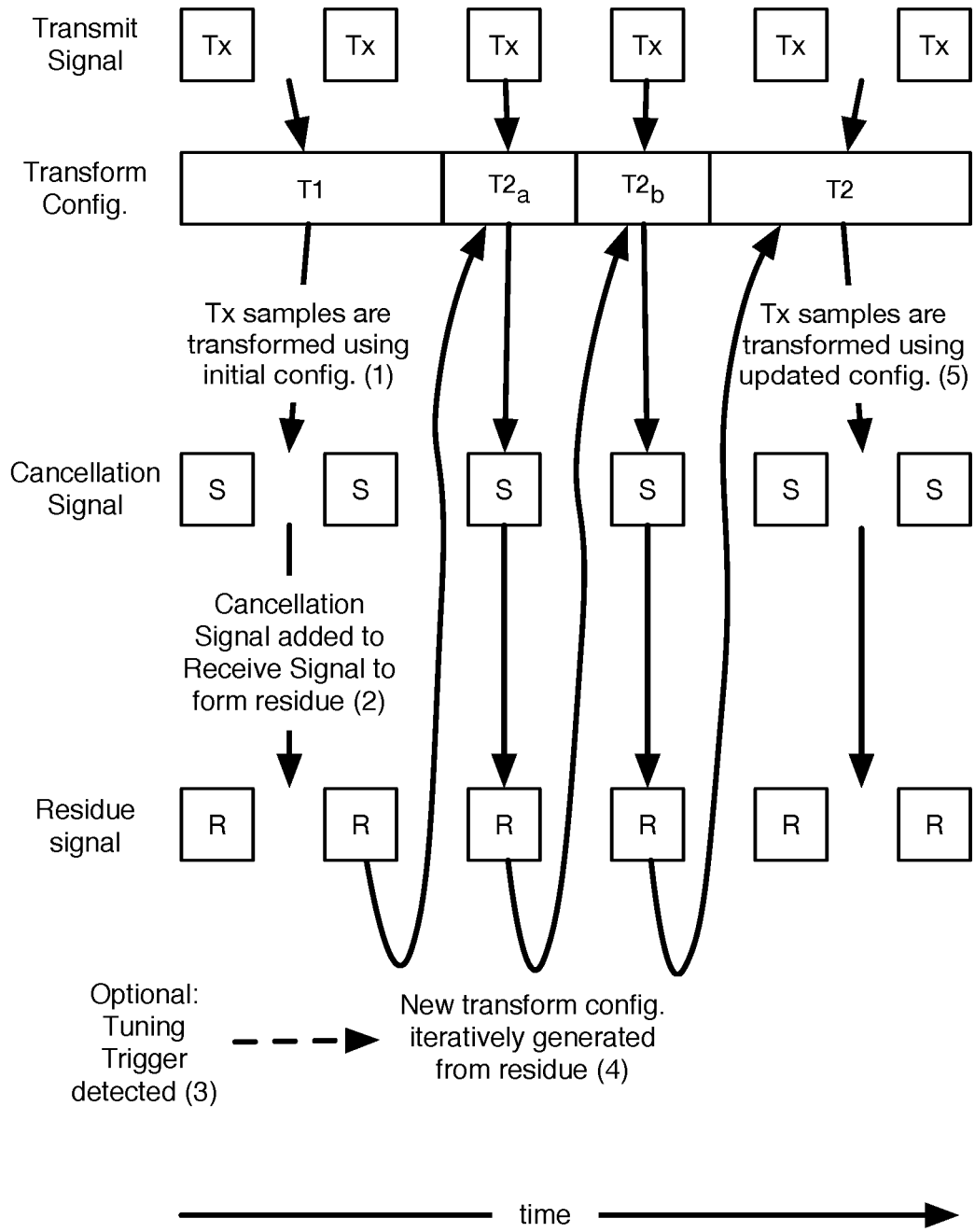
FIG. 15 is an example representation of a method of a preferred embodiment.

An example implementation of the method 200 is as shown in FIG. 15. Note that in this particular example, the transmit signal, cancellation signal, and residue signal are represented as discrete samples (though they need not necessarily be). As shown in this example, the residue signal is used to update the transform configuration (in this case, iteratively), resulting in increased self-interference canceller performance.

The method 200 is preferably implemented by the system 100, but may additionally or alternatively be implemented by any suitable system for adaptively-tuned digital self-interference cancellation. Additionally or alternatively, the method 200 may be implemented using full-duplex communications systems, active sensing systems (e.g., RADAR), wired communications systems, wireless communications systems, and/or any other suitable system, including communications systems where transmit and receive bands are close in frequency, but not overlapping.

S210 includes receiving a digital transmit signal. S210 functions to provide a digital signal intended for transmission by a communications system so that the signal may be used to remove self-interference at the full-duplex wireless communications system receiver. Digital transmit signals received in S210 preferably include digital signals originating from an electronic device, destined for an RF transmitter of a full-duplex radio (or other full-duplex wireless communications system). Digital transmit signals received in S210 may additionally or alternatively include digital transmit signals converted from analog transmit signals (e.g., the RF transmission signal of the RF transmitter of a full-duplex radio) or from any other suitable source. Digital transmit signals received in S210 are preferably encoded for conversion to an analog signal by an RF transmitter, (e.g., encoded via PSK, QAM, OFDM, etc.) but may additionally or alternatively be encoded in any suitable way or unencoded.

S220 includes receiving an initial transform configuration. As described in the system 100 description, the transform configuration preferably includes the type of model or models used by a multi-rate adaptive filter of the digital self-interference canceller as well as configuration details pertaining to the models (each individual model is a model type paired with a particular set of configuration details). For example, one transform configuration might set the multi-rate adaptive filter to use a GMP model with a particular set of coefficients. If the model type is static, the transform configuration may simply include model configuration details; for example, if the model is always a GMP model, the transform configuration may include only coefficients for the model, and not data designating the model type.

The transform configuration may additionally or alternatively include other configuration details related to the signal component generation and/or filtering. For example, if the digital self-interference canceller includes multiple transform paths, the transform configuration may determine the number of these transform paths, which model order their respective component generators correspond to, the type of filtering used by anti-aliasing filters, and/or any other suitable details. In general, the transform configuration may include any details relating to the computation of self-interference cancellation signals by the digital self-interference canceller.

S220 may include receiving the initial transform configuration in any manner; for example, S220 may include receiving the initial transform configuration from local memory.

S230 includes generating a digital self-interference cancellation signal. S230 functions to generate a signal that may be combined with a receive signal of a communications system to reduce self-interference or other noise or undesired signal components in the receive signal. Similarly to in the system 100 description, S230 may include generation of multiple self-interference cancellation signals in the case of MIMO communication.

S230 preferably includes generating the digital self-interference cancellation signal dynamically according to a set transform configuration; that is, the transform configuration preferably defines how a transmit signal is converted and/or modified to create a self-interference cancellation signal. If the transform configuration is updated or otherwise modified, the digital self-interference cancellation signal is preferably then produced using the updated/modified transform configuration.

In one implementation of a preferred embodiment, S230 includes transforming a digital transmit signal (or other transmit signal) into a set of signal components and generating a self-interference cancellation signal by filtering, weighting, and/or combining those signal components through a process substantially similar to the one described in the system 100 description (and as shown in FIGS. 7 and 8). In this implementation, S230 may include generating signal components according to transform paths, where each transform path corresponds to a component of a self-interference model. S230 preferably includes generating signal components for each transform path in parallel simultaneously, but may additionally or alternatively generate them serially and/or transform them at separate times. While S230 preferably includes transforming identical digital transmit signals for each transform path, the digital transmit signals may additionally or alternatively be processed in any suitable way (for instance, S230 may include splitting the digital transmit signal into components and passing separate components to each transform path).

In this implementation, S230 preferably includes creating a self-interference cancellation signal by combining a weighted sum of signal components according to mathematical models (preferably defined by the transform configuration) adapted to model self-interference contributions of the RF transmitter, RF receiver, and/or other sources. Examples of mathematical models that may be used include generalized memory polynomial (GMP) models, Volterra models, and Wiener-Hammerstein models; S230 may additionally or alternatively use any combination or set of models.

S230 may additionally or alternatively include performing post-processing to prepare digital self-interference cancellation signals for combination with receive signals; this may include scaling, shifting, filtering, and/or otherwise modifying the self-interference signals. For example, S230 may include processing self-interference cancellation signals with a blocker filter designed to filter out high-frequency components (e.g., to match a corresponding bandwidth of the RF transmitter). S230 may include matching the sampling rate of self-interference cancellation signals with the sampling rate of the output of the RF receiver through upsampling and/or downsampling as previously described, but may additionally or alternatively not alter the sampling rate of self-interference cancellation signals or set the sampling rate of self-interference cancellation signals to a sampling rate other than that of RF receiver output. Step S230 may include combining linear and non-linear self-interference signals in any suitable way (e.g., if multiple multi-rate filters are used), including combining non-linear or linear self-interference cancellation signal components. For example, S230 may include combining linear and non-linear self-interference signals as a weighted sum. S230 may additionally or alternatively include converting digital self-interference cancellation signals to analog self-interference cancellation signals (e.g., via a DAC and/or upconverter) to allow for combination with analog receive signals.

S240 includes receiving a digital residue signal. S240 functions to enable analysis of digital self-interference canceller performance (or other criteria) by monitoring a received signal after at least some interference cancellation has been performed on the receive signal (i.e., by monitoring the residue signal).

S240 may include receiving a digital residue signal from the digital receive signal (i.e., sampling the receive signal after conversion by the receiver) or including a digital residue signal from any other source (e.g., a downconverted IF or RF receive signal processed through an ADC independent of the receiver).

S240 preferably include receiving a residue signal that has been processed using all self-interference cancellers; that is, if a system includes multiple self-interference cancellation signals, the residue signal is preferably the receive signal after combination with all of those self-interference cancellation signals. Additionally or alternatively, S240 may include receiving a partial residue signal (e.g., a receive signal that has been processed using only a subset of self-interference cancellation signals present).

S240 may additionally or alternatively include receiving multiple residue signals (e.g., one residue signal after analog self-interference cancellation, but before digital self-interference cancellation, and another after both analog and digital self-interference cancellation). This may be used to monitor digital and analog self-interference cancellation contributions independently.

S240 may include processing the residue signal in any manner; this may include scaling, shifting, filtering, and/or otherwise modifying the residue signal. In one implementation of a preferred embodiment, S240 includes modifying the scale factor of a digital scaler and/or analog/digital amplifier (e.g., a VGA) in the path of the residue signal. In particular, it may be useful to modify the gain of a VGA in a situation where the residue signal is sampled using an ADC independent of the receiver (as shown in FIG. 2). In this situation, modifying gain (or DC offset) of a VGA coupled to the ADC may allow for increased resolution in the received residue signal by centering the residue signal in the window of ADC signal conversion (preventing loss of signal under the noise floor and/or above the clipping threshold).

S240 may additionally or alternatively include filtering the residue signal; this may enable focus on a particular type, source, or spectrum of self-interference. For example, a receiver may receive signals across a bandwidth of $f_0 \pm 20$ MHz, while self-interference due to transmission may be primarily present on a bandwidth of $f_0 \pm 10$ MHz. In such an example, filtering the residue to focus on the spectrum where self-interference cancellation is desired may result in increased performance.

S250 includes detecting a tuning trigger. S250 functions to identify that the digital self-interference canceller (and/or any analog cancellers) may need tuning. Tuning triggers are preferably linked to degradation in self-interference cancellation performance, but may additionally or alternatively be linked to any other metric (e.g., elapsed time since last tuning). Tuning triggers may also be manual (e.g., a system administrator may request tuning).

Some sources of tuning triggers include signal data (e.g. IF transmit signal, digital transmit signal, RF receive signal), full-duplex radio settings (e.g. RF transmitter power, antenna position), full-duplex radio characteristics (e.g. receiver operating characteristics, transmitter operating characteristics), environmental data (e.g., transceiver temperature, ambient temperature, ambient humidity), elapsed time, and/or any other input relating to self-interference present in the receive signal.

Tuning triggers preferably occur when source data values cross some threshold (e.g., a trigger occurs when RF transmit power exceeds 100 mW, a trigger occurs when a digital transmit signal drops in power more than 20% in a time period less than 100 ms, a trigger occurs when transmitter temperature changes more than 5 degrees Celsius from the temperature at the last tuning) or in response to changes in state (e.g., any time transmission frequency changes). Tuning triggers may additionally or alternatively be generated from trigger sources in any suitable manner.

Tuning triggers are preferably directly linked to self-interference cancellation performance, but may additionally or alternatively be indirectly linked or not linked to self-interference cancellation performance. Self-interference cancellation performance may be monitored in any suitable manner; for example, received signal power may serve as an analogue for self-interference cancellation performance. If it is known that received signals will have power of at most −30 dBm, any power above this level may be caused from self-interference or other noise. As another example, self-interference cancellation performance may be estimated by comparing signals received when the transceiver's transmitter is active to signals received when the transceiver's transmitter is inactive.

In one implementation of a preferred embodiment, tuning triggers for the digital self-interference canceller are generated in response to analog self-interference canceller performance after analog canceller tuning. For example, an analog self-interference canceller may be retuned. During the retuning process of the analog canceller, the digital transform may be held static (i.e., the digital canceller is not being tuned) until either analog canceller tuning is finished, or analog canceller tuning has reached a threshold (i.e., analog self-interference cancellation has reduced residual signal power below some threshold). The tuning trigger for the digital self-interference canceller may be generated by the analog tuning completion and/or analog tuning threshold crossing.

S260 includes modifying analog canceller operation. S260 functions to modify operation (e.g., tunable configuration settings, coupling, system state, etc.) of an analog self-interference canceller coupled to a communications system operating the method 200. In particular, S260 preferably functions to modify analog canceller operation and/or tuning in order to enhance digital canceller tuning and/or performance.

For example, S260 may include holding an analog canceller configuration constant (i.e., not changing via tuning) in order to isolate the effects caused by changing digital self-interference canceller transform configurations. Likewise, S260 may include pausing or stopping an analog canceller tuning process for the same reason.

As another example, S260 may include pausing or stopping the operation of an analog self-interference canceller (e.g., such that the only cancellation performed on the receive signal is by the digital self-interference canceller).

S260 may additionally or alternatively include alternating gain, phase, delay, etc. of analog self-interference cancellation signals; for example, to better match the gain of digital cancellation signals to analog cancellation signals.

S260 may additionally or alternatively include providing information to a tuning circuit (or other controller) to aid in analog canceller tuning. For example, S260 may include pausing analog canceller tuning to perform digital tuning, and then transmitting information describing (in some manner) the digital transform configuration to the analog tuning controller to aid in further modifying analog canceller tuning settings.

Note that S260 may occur at any point; for tuning applications, it may be useful for S260 to be performed before sampling the residue signal (such that the transform configuration is based on the residue signal as sampled after performance of S250); while for enhancing analog canceller performance it may be useful for S260 to be performed after the initial transform configuration has been updated.

S270 includes modifying digital canceller operation. S270 functions to modify operation (e.g., coupling, signal inputs and outputs, operational states, etc.) of the digital self-interference canceller. S270 preferably involves modifying digital canceller operation in ways alternative to modifying the transform configuration, but there may be some overlap between S270 and S280 (in that S270 may include altering some transform configuration details). In particular, S270 preferably functions to modify digital canceller operation in order to enhance digital canceller tuning and/or performance.

For example, S270 may include preventing a digital canceller from updating a transform configuration while an analog canceller is performing tuning. As another example, S270 may include pausing or stopping operation of the digital self-interference canceller (e.g., such that the only cancellation performed on the receive signal is by analog self-interference cancellers). S270 may additionally or alternatively include alternating gain, phase, delay, etc. of digital self-interference cancellation signals in any manner.

In one implementation of a preferred embodiment, S270 includes scaling the digital self-interference cancellation signal (i.e., the output of the digital canceller) to reduce interference present in the received residue signal. This may include, for instance, increasing and/or decreasing cancellation signal gain and observing the residue signal. Scaling the digital self-interference cancellation may include altering scaling settings of a digital scaler and/or modifying scaling settings of an analog amplifier (e.g., gain of a VGA). In particular, it may be useful to modify the gain of a VGA when the output of the digital self-interference canceller is coupled to an analog receive line via a DAC (as shown in FIG. 2). In such a configuration, the VGA (preferably in-line between the DAC and the analog receive signal) can scale the digital self-interference cancellation signal to appropriately match the magnitude of the self-interference cancellation signal to receive signal components for which removal is desired. S270 may alternatively include scaling the digital self-interference cancellation signal to isolate canceller effects (e.g., attenuate the digital self-interference cancellation signal to isolate effects of the analog self-interference canceller).

Note that S270 may occur at any point; for tuning applications, it may be useful for S270 to be performed before sampling the residue signal (such that the transform configuration is based on the residue signal as sampled after performance of S270); while for enhancing digital canceller performance it may be useful for S270 to be performed after the initial transform configuration has been updated.

S280 includes updating the initial transform configuration. S280 functions to tune the digital self-interference canceller (and thus increase canceller performance) based on data from the received residue signal. Updating the transform configuration S280 may include setting an updated transform configuration by selecting from stored static configurations, from generating a new transform configuration, or by any other suitable manner or combination of manners. For example, S280 may include choosing from three static transform configurations based on their applicability to particular signal and/or environmental conditions (the first is appropriate for low transmitter power, the second for medium transmitter power, and the third for high transmitter power). As another example, S280 may include generating an updated configuration based on signal and/or environmental conditions; if a GMP model is used in non-linear transformation, the coefficients of a GMP model may be computed by a formula that takes transmitter power, temperature, and receiver power as input.

S280 may include setting transform configurations based on a variety of input data (whether transform configurations are selected from a set of static configurations or generated according to a formula or model). Input data may include static environmental and system data (e.g. receiver operating characteristics, transmitter operating characteristics, receiver elevation above sea-level), dynamic environmental and system data (e.g. current ambient temperature, current receiver temperature, average transmitter power, ambient humidity), system configuration data (e.g. receiver/transmitter settings), and/or signal data (e.g., digital transmit signal, RF transmit signal, RF receive signal, digital receive signal).

Step S280 may be performed at any time, but is preferably performed in response to either a time threshold or a tuning trigger (received in S250). For example, S280 may adapt transform configurations every ten seconds according to changed input data values. As another example, transform configurations may be re-set whenever transmitter power thresholds are crossed (e.g. whenever transmitter power increases by ten percent since the last transform configuration setting, or whenever transmitter power increases over some static value).

Step S280 may additionally or alternatively include cooperating with analog cancellation methods of a full-duplex radio if present; for instance, adapting transform configurations based on analog cancellation data, or coordinating transform configuration setting times based on analog cancellation configurations to reduce overall self-interference (or for any other suitable reason).

Step S280 preferably adapts transform configurations to reduce self-interference for a given transmit signal and set of system/environmental conditions. Step S280 may adapt transform configurations and/or transform-configuration-generating algorithms using analytical methods, online gradient-descent methods, least-mean-squares (LMS) methods, recursive-least-squares (RLS) methods, regularized and constrained solver methods (e.g. LASSO), minimum mean square error (MMSE) methods, and/or any other suitable methods. LMS methods may include regularization, one example LMS method includes leaky LMS; RLS methods may also include regularization. Adapting transform configurations preferably includes changing transform configurations based on learning. In the case of a neural-network model, this might include altering the structure and/or weights of a neural network based on test inputs. In the case of a GMP polynomial model, this might include optimizing GMP polynomial coefficients according to a gradient-descent method.

Figure 19A:
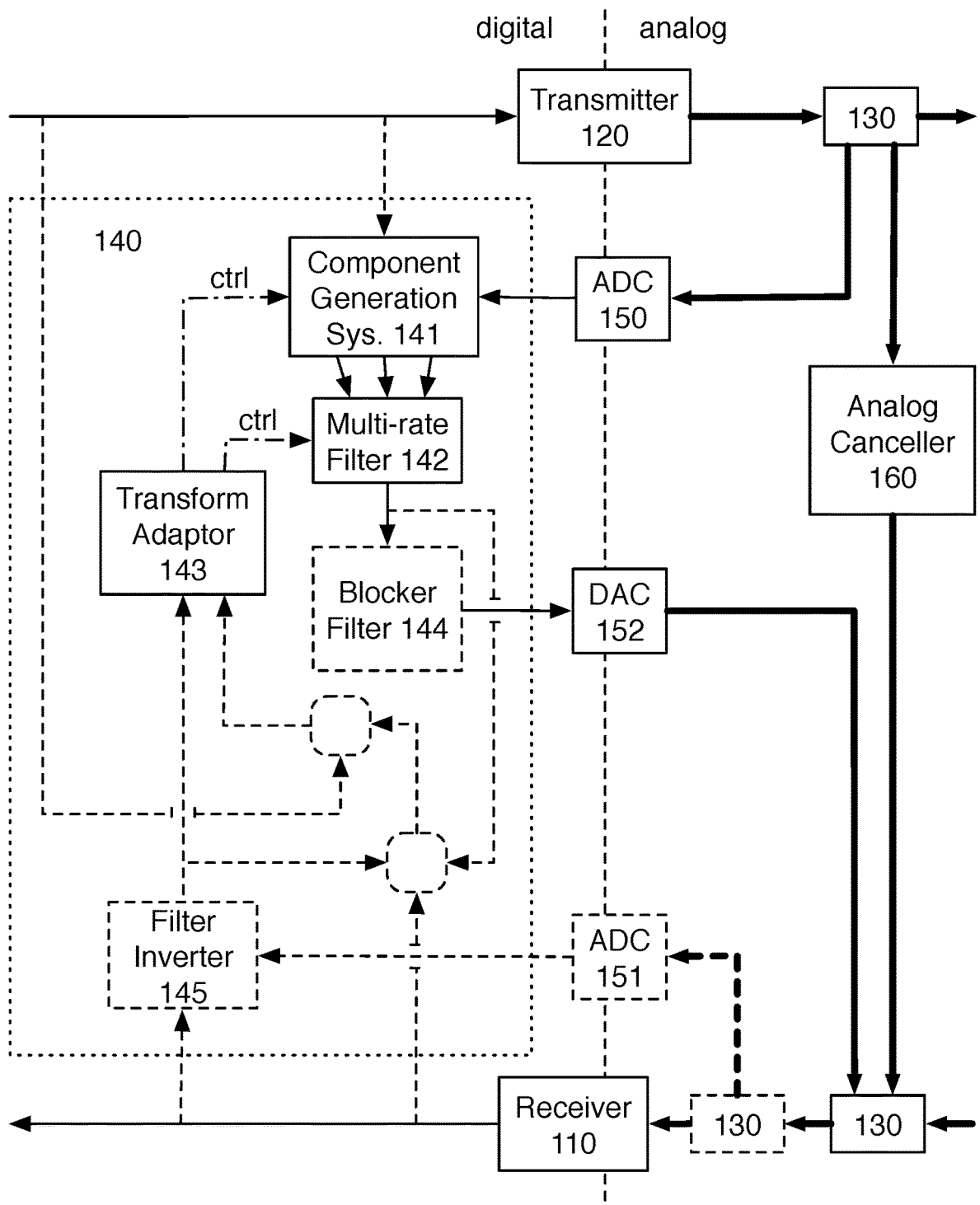
FIG. 19A is a diagram representation of a system of a preferred embodiment.
Figure 19B:
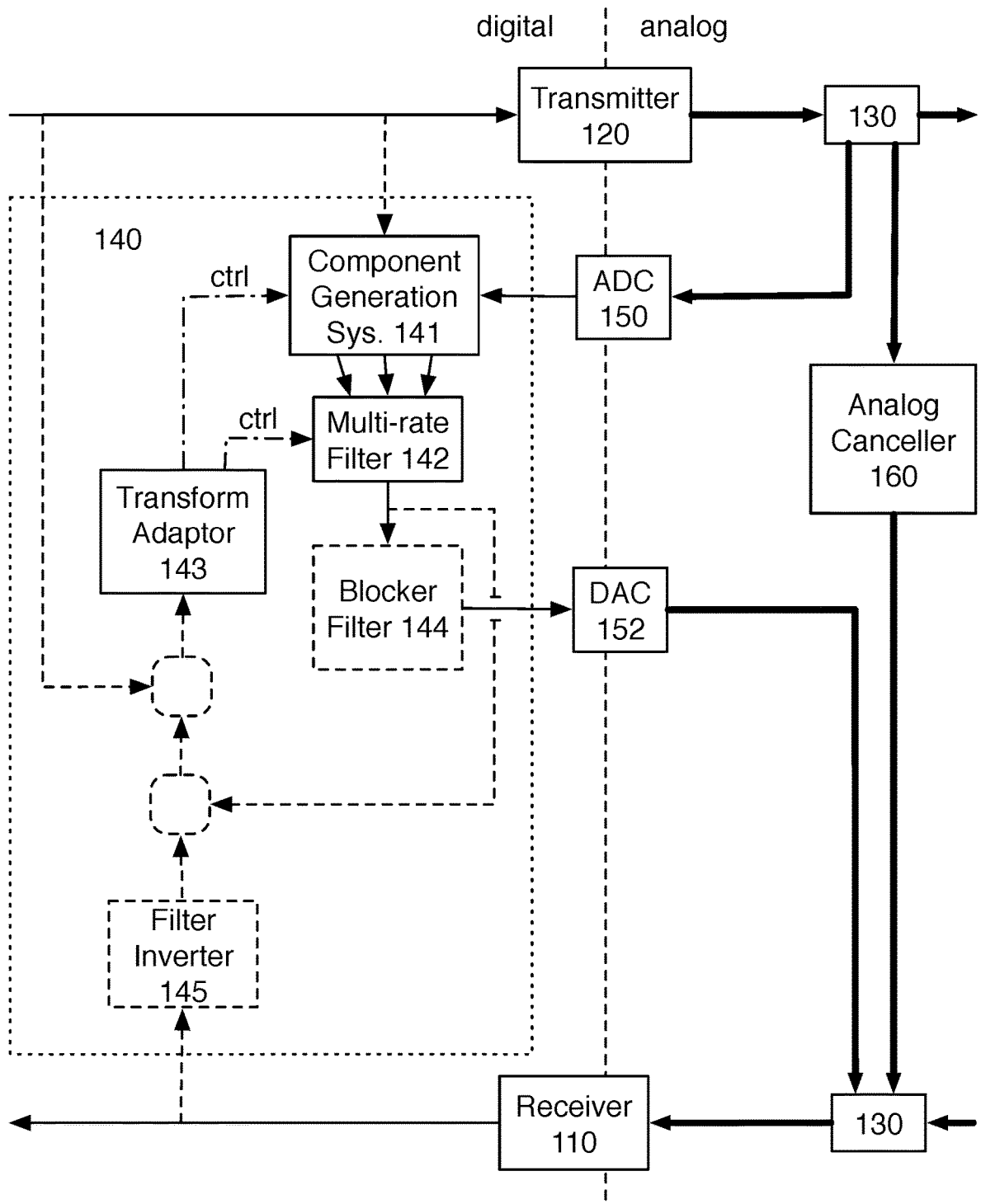
FIG. 19B a diagram representation of an example of the system depicted in FIG. 19A.

In variations of a preferred embodiment, Step S280 includes adapting transform configurations based on a combination of residue (here referred to as Rxr) and transmit signals (here referred to as Tx), by computing the self-interference channel based on the combination and adapting (updating) the transform configuration according to the computed self-interference channel (e.g., as shown in FIGS. 19A and/or 19B). The combination may be a ratio of the residue and transmit signals, a function that takes the residue and transmit signals as inputs and produces a self-interference channel estimate as an output, or it may be any other suitable combination that can be used to determine the self-interference channel. Combining the residue and transmit signals is preferably performed in the frequency domain, but may alternatively be performed in the time domain. Combining the residue and transmit signals may involve multiple steps; for example, it may be performed iteratively. In such cases, each of the steps may be performed in either the time domain or the frequency domain. Any combination of the residue and transmit signals, and/or any signal generated based on the residue and transmit signals, may be referred to as a composite residue signal.

In one implementation of a preferred embodiment, Step S280 includes adapting transform configurations based on a ratio of residue and transmit signals in the frequency domain:

$$\frac{Rxr}{Tx} = H - \hat{H}$$

by performing iterative measurements to determine the Rxr/Tx ratio.

The Rxr signal is preferably received in S240. The composite receive signal (i.e., the receive signal after self-interference cancellation, referred to as Rx) may be measured during a period where transmit signal noise is measurably present in the composite receive signal. Correspondingly, S280 may include detecting that the total composite receive signal is larger than a certain threshold.

Likewise, the Tx signal is preferably received in S210. Additionally or alternatively to detecting that the total composite receive signal is larger than a certain threshold, S280 may include detecting that the total transmit signal is larger than a certain threshold (and/or may include adjusting attenuation with respect to transmit signal transmission or sampling).

Since the self-interference cancellation channel is known for each transform configuration, the composite receive signal can be processed with the Tx signal; from this processing output, Rxr/Tx can be determined, and the self-interference cancellation channel can be optimized to reduce self-interference. For example, the residue and transmit signal may be measured:

$$Rxr = Tx(H - \hat{H})$$

from this equation, $(H - \hat{H})$ can be determined and tuned to reduce self-interference.

In some implementations, the Rxr/Tx ratio may be measured as follows:

$$(Tx^* \times Tx)^{-1}(Tx^* \times Rxr)$$

where Tx* is the complex conjugate of the Transmit signal (Tx). Additionally or alternatively, S280 may include measuring the Rxr/Tx ratio in any other manner.

Step S280 may further include adapting transform configurations based on an average of Rxr/Tx ratios—averaging representing a tradeoff between speed and accuracy. In general, more samples in an average increases the signal to noise ratio (SNR) of the measured signal, but results in slower adaptation. In one variation of a preferred embodiment, Step S280 includes increasing averaging sample amount as the Rxr/Tx or Rx/Tx ratio decreases (e.g., below certain threshold values). In a second variation of a preferred embodiment, S280 may include modifying averaging sample amount based on the rate of change of Rxr/Tx and/or Rx/Tx ratios. S280 may additionally or alternatively include modifying averaging settings in response to any of the data used to update the transform configuration.

Note that S280 preferably includes transforming the Rxr and Tx signals from the time domain to the frequency domain using a Fast Fourier Transform (FFT). After conversion to the frequency domain, the self-interference cancellation channel may be tuned, after which point the self-interference cancellation channel solution may be converted back to the time domain using an Inverse Fast Fourier Transform (IFFT), as shown below:

$$F\left(\frac{Rxr}{Tx}\right) = F(H) - F(\hat{H})$$

$$\hat{H} = F^{-1}(F(\hat{H}))$$

Typically, the FFT may be performed using a Discrete Fourier Transform (DFT) matrix. Likewise, the IFFT may be calculated using the pseudo-inverse of the DFT matrix; i.e., an Inverse Discrete Fourier Transform (IDFT) matrix. Calculating the IDFT using the DFT without modification results in the same number of time domain signal components generated (e.g., 'taps' of the self-interference cancellation channel) as frequency points in the original DFT.

In many cases, it may be desirable to perform the DFT using a high resolution matrix (i.e., use many frequencies), while receiving a lower-resolution (i.e., fewer number of time domain components) solution. Likewise, it may be desirable to restrict the solution to specific frequencies of interest (or simply lower frequency resolution used to generate the solution). To accomplish this, in one embodiment, S280 includes performing the IFFT using a reduced IDFT matrix calculated by first reducing the number of time and frequency domain components (e.g., zeroing out parts of the matrix, neglecting parts of the matrix) present in the DFT matrix and then calculating the pseudo-inverse of this reduced DFT matrix to generate the reduced IDFT matrix.

Frequency and time domain components may be removed in any manner and to accomplish any goal. For example, time domain components may be removed to match a certain solution size (e.g., 64 taps), and frequency components may be removed if they are not considered frequencies of particular interest (e.g., as determined from a lookup table of which receive frequencies are important, by measuring the accuracy of self-interference cancellation at different frequencies, by measuring the amount of self-interference present at different signals, etc.). Alternatively, DFT matrix reduction may be performed in any way.

Note that many components of the self-interference channel solution may be correlated; this correlation can result in slow convergence of transform configuration parameters. Resultantly, in one implementation of a preferred embodiment, S280 includes orthogonalizing (or otherwise decorrelating) components of the self-interference channel using a decorrelation matrix. For example, S280 may include performing this decorrelation using a static decorrelation matrix based on a Gaussian input distribution (or other expected signal distribution) for a given transmission power or using a static decorrelation matrix based on subtraction of expected transmission power; e.g., $$\begin{bmatrix} \hat{s}_1 \\ \hat{s}_3 \\ \hat{s}_5 \end{bmatrix} = \begin{bmatrix} 1 & 0 & 0 \\ -2\sigma^2 & 1 & 0 \\ (15\sigma^4) & -10\sigma^2 & 1 \end{bmatrix} * \begin{bmatrix} s_1 \\ |s_1|^2 * s_1 \\ |s_1|^4 * s_1 \end{bmatrix}$$

where $\sigma^2$ is the power of the linear transmit signal $s_1$.

S280 may alternatively include performing decorrelation using any other method, including using singular value decomposition (SVD), a dynamically computed decorrelation matrix, and/or a matrix similar to the above exemplified static matrix, except with expected power computed dynamically.

S280 may additionally or alternatively include adapting transform configurations based on test input scenarios (e.g. scenarios when the signal received by the RF receiver is known), scenarios where there is no input (e.g. the only signal received at the RF receiver is the signal transmitted by the RF transmitter), or scenarios where the received signal is unknown. In cases where the received signal is an unknown signal, transform configurations may be adapted based on historical received data (e.g. what the signal looked like ten seconds ago) or any other suitable information. Transform configurations may additionally or alternatively be updated based on the content of the transmitted signal.

Note that while the preceding paragraphs primarily describe a SISO (single-input single-output) implementation of the method 200, the method 200 may additionally or alternatively be implemented with a MIMO (multiple-input, multiple-output) system (or MISO, SIMO, etc.). Many of the details surrounding MIMO implementation of the method 200 are covered by the system 100 description (e.g., how signals may be split, cross-channel self-interference concepts, etc.). In addition to the details described in the system 100 description, a MIMO implementation may result in modifications to S280.

In a MIMO implementation, S280 may include calculating multiple self-interference cancellation channels. For example, S280 may include calculating/tuning four self-interference cancellation channels for a 2×2 MIMO system by computing the self-interference cancellation channels for each receive channel separately. For receive channel $Rx_1$ and transmit channels $Tx_1$, $Tx_2$ this is as follows:

$$\begin{bmatrix} Tx_1^1 & Tx_2^1 \\ Tx_1^2 & Tx_2^2 \end{bmatrix} \begin{bmatrix} (H_{11} - \hat{H}_{11}) \\ (H_{12} - \hat{H}_{12}) \end{bmatrix} = \begin{bmatrix} Rxr_1^1 \\ Rxr_1^2 \end{bmatrix}$$

for $H_{11}$ (self-interference in $Rx_1$ caused by $Tx_1$) and $H_{12}$ (self-interference in $Rx_1$ caused by $Tx_2$). Note that for calculating the channels with two transmitters, two time measurements (for example, two samples) are taken of the transmit and receive signals (shown in superscript, e.g. $Tx_1^1$ is the first measurement of $Tx_1$).

This process may likewise be repeated for the self-interference in $Rx_2$:

$$\begin{bmatrix} Tx_1^1 & Tx_2^1 \\ Tx_1^2 & Tx_2^2 \end{bmatrix} \begin{bmatrix} (H_{21} - \hat{H}_{21}) \\ (H_{22} - \hat{H}_{22}) \end{bmatrix} = \begin{bmatrix} Rxr_2^1 \\ Rxr_2^2 \end{bmatrix}$$

Note that the self-interference channel calculation process is dependent on the degree of correlation present between transmitted signals of the MIMO system; it may be difficult to accurately or quickly calculate self-interference channels when transmitted signals are highly correlated. Resultantly, S280 may include calculating the self-interference channel only when transmitter correlation is below some threshold. Alternatively, S280 may include modifying the calculation (if, say, it is detected that one of the transmitters is off or otherwise not transmitting a signal) to remove the contributions of one or more transmit signals. Transmitter status detection may occur directly (e.g., transmitter informs the cancellation system if it is on or off) or may be detected through analysis of signal components (e.g., Rx/Tx tends to infinity).

3. Method for Processing Channel Representations

As previously described, interference cancellers model a transformation that occurs to an input signal after some event (e.g., the relationship between a transmit signal immediately prior to a transmit antenna and the received components of that transmit signal at a receiver) and use that model to generate an interference cancellation signal from the input signal. Obviously, an accurate model is important to effectively reduce self-interference in a signal, but there are other considerations that may affect how transform models are chosen or set, particularly for digital interference cancellers.

In particular, the transformation used by an interference canceller has an effect on the time delay experienced by signal components of different frequency as they are transformed. In some environments (like LTE, where transformation may require modeling multiple rapidly changing narrowband channels), it is important to reduce the amount of delay experienced by interference cancellation signal components both to reduce the response time to changing input signal conditions, and, relatedly, to reduce the amount of time it takes to iteratively tune a canceller.

A method 300 for processing channel representations functions to modify channel representations (i.e., transforms) in order to reduce the self-interference canceller response times. The method 300 preferably includes receiving a transform and modifying the transform according to a transform modification configuration. The transform modification configuration specifies how the transform will be modified. While examples of transform modification will be given, it is understood that the transform modification configuration can take any form and determine transform modification configuration based on any input.

In particular, a transform that is represented in the frequency domain and contains sharp edges, discontinuities, and other rapidly-varying features may require a large number of components to accurately implement the transform in the time domain (e.g., in the interference canceller). Thus, it may be desirable to smooth such features in the frequency domain representation of the transform prior to converting the transform to a time domain representation, in order to simplify the time domain representation of the transform in the canceller. For example, the transform may be implemented as a number of time delay elements, each time delay element corresponding to a time domain component of the signal to be transformed; in such a case, smoothing of the frequency domain representation of the transform before converting and modeling the transform in the time domain may reduce the number of time delay elements (or taps) that must be used in the canceller. In another example, the transform may be implemented as a set of equations operating on the time domain signal components fed into the canceller; in such a case, smoothing may benefit the cancellation process by reducing the required number of equations necessary to represent the transform.

In smoothing either the magnitude or phase response of the transform in the frequency domain, it may be necessary to identify and/or locate edges or other similarly abrupt changes and/or rapidly varying features. Various techniques may be used to locate the edges. A first such variation is to compute the local derivative of the response vs. frequency (e.g., using a finite-differencing scheme) at each frequency value of the response, and to consider an "edge" to be located at any frequency where the local derivative exceeds a particular threshold. Thus, a local slope that is sufficiently "steep" (i.e., has a sufficiently large first derivative) can be recognized as an edge or other feature in need of smoothing. A related variation includes computing the local first derivative only within frequency bands of the response where sharp variations are known to occur, in order to reduce the computation time of edge detection. In other variations, locating edges or other abrupt changes may include one or a combination of step detection algorithms, such as 0-degree spline fitting, piecewise constant denoising, and variational methods (e.g., the Potts model). Additionally or alternatively, abrupt changes in the responses requiring smoothing can be located in any other suitable manner.

Figure 16:
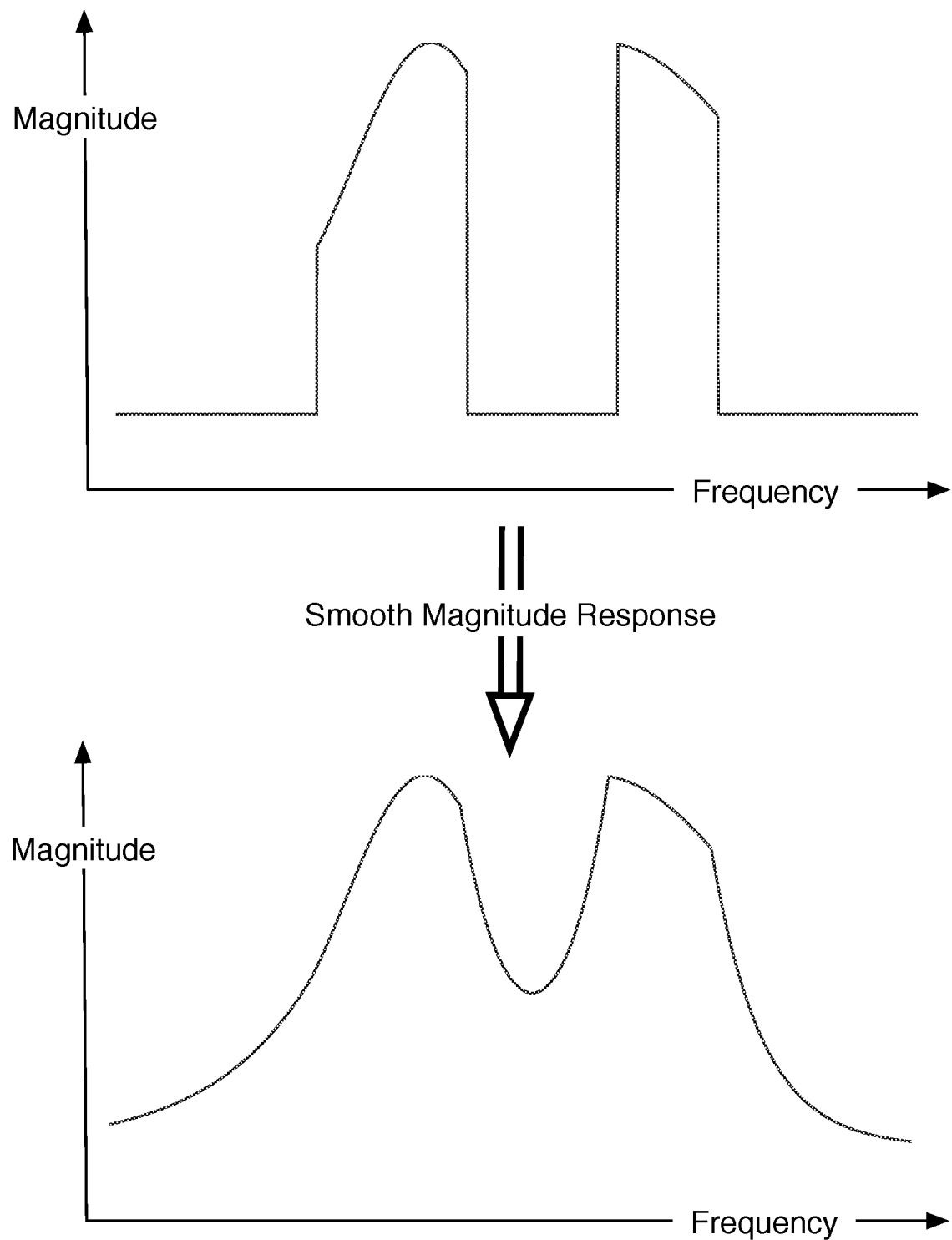
FIG. 16 is an example representation of magnitude response smoothing of a method of a preferred embodiment.

As shown in FIG. 16, the method 300 preferably includes smoothing the magnitude response of a transform. In this example, exponential decay functions are matched to edges (i.e., where the derivative of magnitude response vs. frequency exceeds a threshold) of the magnitude response. However, other functions may additionally or alternatively be matched to the edges of the magnitude response, such as a polynomial function, a cubic spline, or any other suitable smoothly varying function. The function used is preferably selected in order to minimize the number of components needed to represent the transform in the time domain, but can alternatively be selected for any suitable reason. The method 300 may include extrapolating or otherwise modifying magnitude response of a transform in any manner, including performing curve fitting on portions of the magnitude response of a transform. The method 300 may also include filtering portions of the magnitude response of the transform (e.g., median filtering, convolution filtering, and/or any other suitable smoothing filtering).

Figure 17:
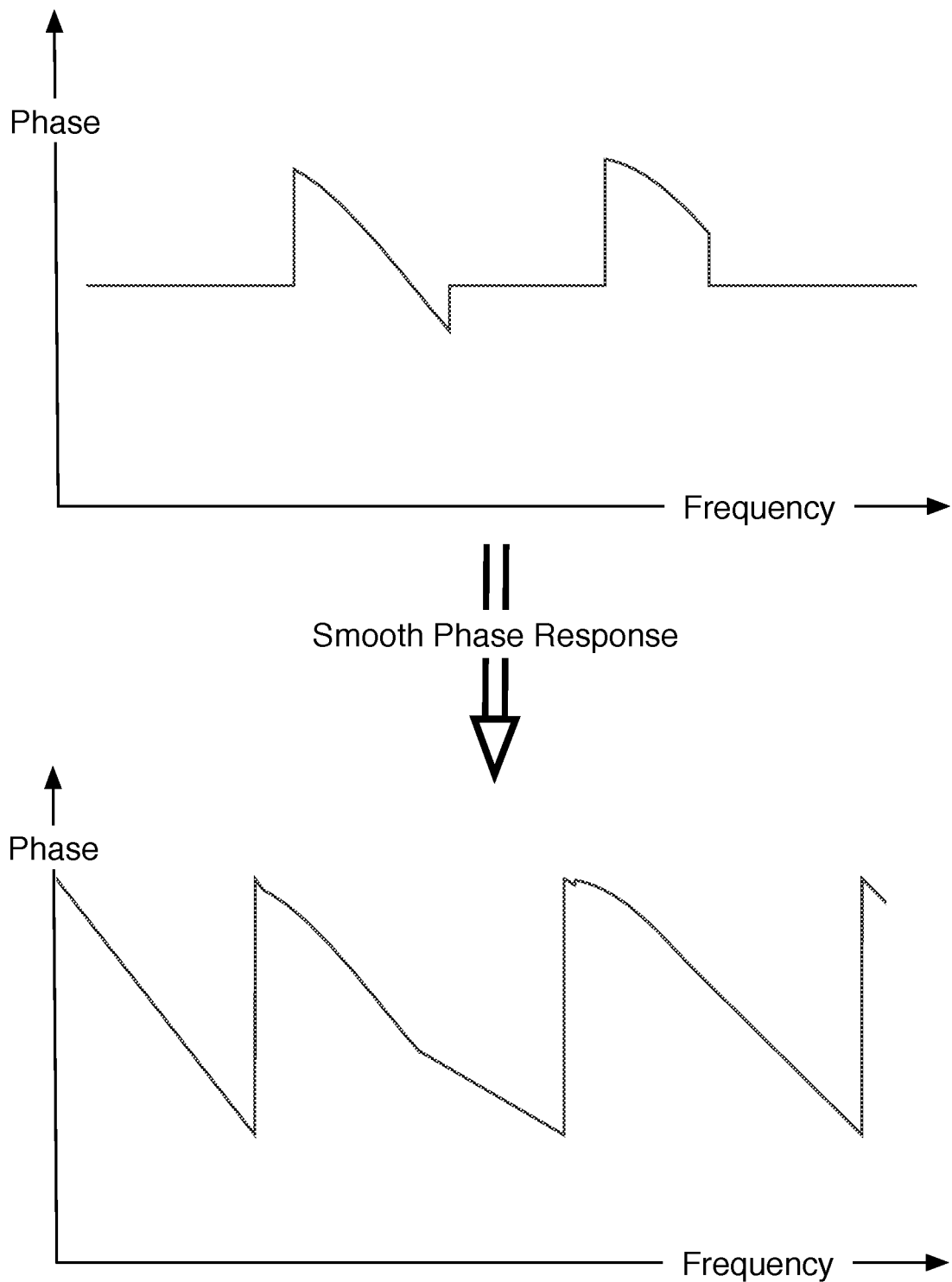
FIG. 17 is an example representation of magnitude response smoothing of a method of a preferred embodiment.

As shown in FIG. 17, the method 300 preferably also includes smoothing the phase response of the transform. In this example, phase is extrapolated linearly between edges of phase response (i.e., where the derivative of phase response vs. frequency exceeds a threshold). The method 300 may include extrapolating or otherwise modifying phase response of a transform in any manner, including performing curve fitting on portions of the phase response of a transform. The method 300 may also include filtering portions of the phase response of the transform (e.g., median filtering, convolution filtering, and/or any other suitable smoothing filtering).

4. Method for Processing Channel Representations

Another issue that may arise in communications environments where data is split over multiple frequencies (e.g., subchannels) is that signal magnitude (of both receive and transmit signals) may vary greatly between signals received on different sub-channels. This variation in signal magnitude means that a large range (and correspondingly large number of bits) must be used to store and/or manipulate sampled signals in the digital domain, which can in turn make estimating a channel between two signals at different frequencies difficult. This problem is further exacerbated by the channel estimation process itself—a range of 30 dB in signal range can lead to a 120 dB range in channel estimation calculations ($\propto \sim s^4$).

Figure 18:
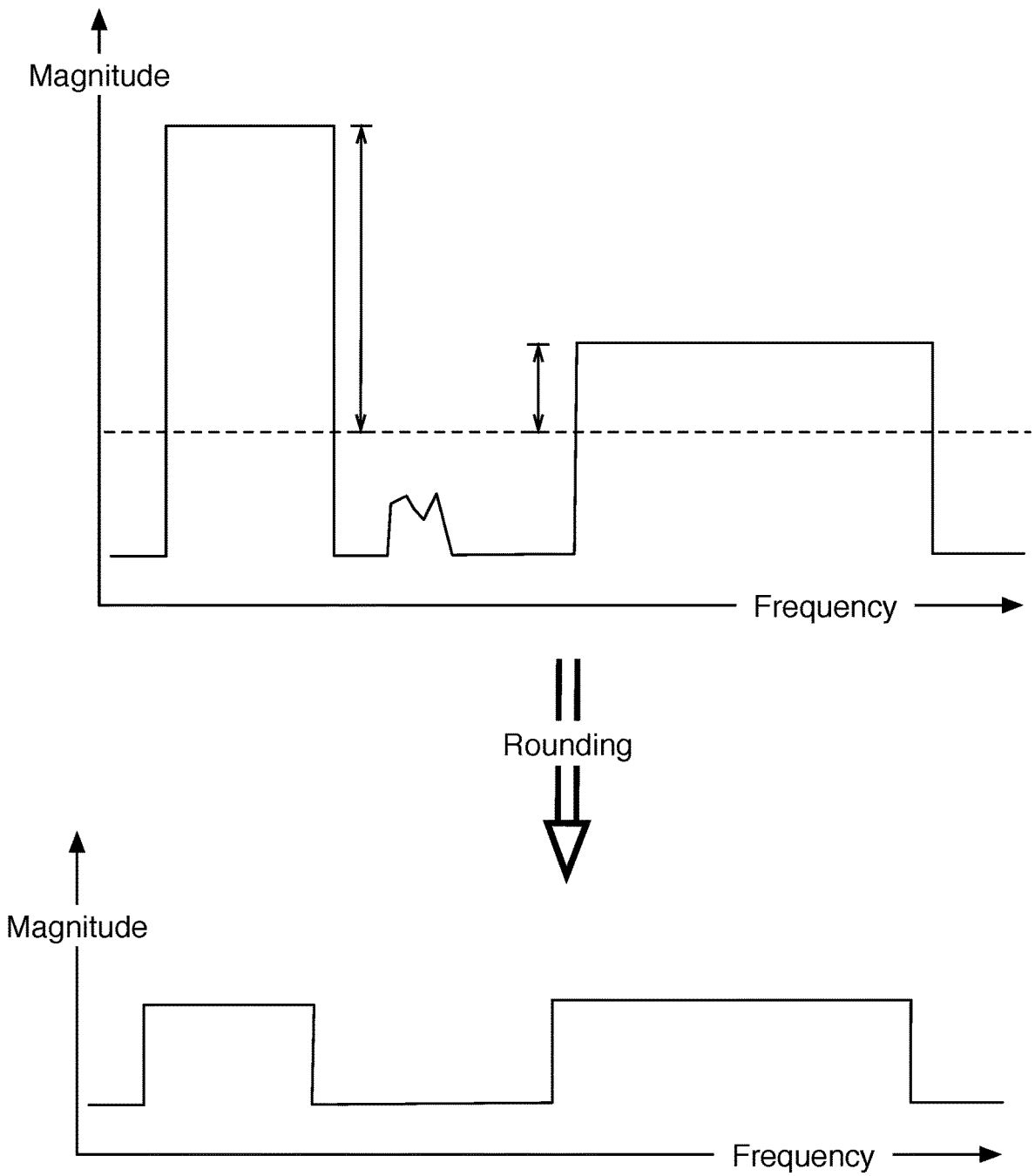
FIG. 18 is an example representation of channel representation processing of a method of a preferred embodiment.

As shown in FIG. 18, the method 400 functions to adaptively round (or normalize) digital signal samples (e.g., as sampled by an ADC, or transformed at a later time) to reduce the range (and thus number of significant bits) required to perform channel estimation (or other processes involving communications system signals).

The method 400 preferably includes establishing a noise offset for a channel, establishing a maximum rounding value for each sub-channel of the channel, and rounding down sub-channels by at least the positive difference of the maximum rounding value and the noise offset.

The noise offset level is preferably chosen to prevent signal samples from being rounded down to the point that noise in the unoccupied frequency portions of the signal becomes significant compared to signal samples. The noise offset level may be established by observing noise in the unoccupied frequency portions of the signal or by any other method.

The maximum rounding value for each sub-channel is preferably chosen by calculating, for each transmit signal s and each receive signal x=sH+v respectively per individual subcarrier;

$$\sum_n s^H s, \sum_n s^H x$$

and analyzing these sums to determine a maximum value.

The maximum rounding value may additionally or alternatively be chosen in any manner. As described, rounding $\Sigma_n s^H s, \Sigma_n s^H x$ for a sub-channel preferably includes rounding by the difference between the maximum rounding value and the noise offset, assuming that the difference is positive. Additionally or alternatively, rounding may occur based on any process.

The methods of the preferred embodiment and variations thereof can be embodied and/or implemented at least in part as a machine configured to receive a computer-readable medium storing computer-readable instructions. The instructions are preferably executed by computer-executable components preferably integrated with a system for wireless communication. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

As a person skilled in the art will recognize from the previous detailed description and from the figures and claims, modifications and changes can be made to the preferred embodiments of the invention without departing from the scope of this invention defined in the following claims

We claim:

1. A system for adaptively-tuned digital self-interference cancellation comprising:
a transmit coupler, communicatively coupled to an analog transmit signal of a transmitter of a communications system, that samples the analog transmit signal to create a sampled analog transmit signal;
an analog self-interference canceller that generates an analog self-interference cancellation signal from the sampled analog transmit signal;
a receive coupler, communicatively coupled to an analog receive signal of a receiver of the communications system, that combines the analog self-interference cancellation signal with the analog receive signal, therefore reducing self-interference in the analog receive signal; and
a digital self-interference canceller that generates a digital self-interference cancellation signal from a digital transmit signal of the communications system, the digital self-interference canceller comprising:
a component generation system that generates a first set of self-interference cancellation signal components from the digital transmit signal;
a first multi-rate filter that, according to a transform configuration, combines the first set of self-interference cancellation signal components to generate the digital self-interference cancellation signal; and
a transform adaptor that updates the transform configuration;
wherein the digital self-interference cancellation signal is combined with a digital receive signal to form a digital residue signal; wherein the digital self-interference canceller generates a composite residue signal, non-identical to the digital residue signal, from the digital residue signal and the digital transmit signal; wherein the transform adaptor updates the transform configuration based on the composite residue signal.

2. The system of claim 1, wherein the transform adaptor updates the transform configuration by computing a self-interference channel from the composite residue signal and updating the transform configuration based on the computed self-interference channel.

3. The system of claim 2, wherein the transform adaptor converts the composite residue signal to a frequency domain to form a frequency-domain-converted composite residue signal and computes the self-interference channel based on the frequency-domain-converted composite residue signal.

4. The system of claim 3, wherein the transform adaptor computes the self-interference channel in a time domain based on the frequency-domain-converted composite residue signal to form a time-domain-converted self-interference channel.

5. The system of claim 4, wherein computing the self-interference channel further comprises computing the self-interference channel based on the frequency-domain composite residue signal.

6. The system of claim 5, wherein computing the self-interference channel comprises computing the self-interference channel in a time domain based on the frequency-domain composite residue signal to form a time-domain-converted self-interference channel.

7. The system of claim 2, wherein the digital self-interference canceller generates the composite residue signal by: converting the digital residue signal to a frequency domain to form a frequency-domain-converted digital residue signal; converting the digital transmit signal to the frequency domain to form a frequency-domain-converted digital transmit signal; and generating a frequency-domain composite residue signal from the frequency-domain-converted digital residue signal and the frequency-domain-converted digital transmit signal.

8. The system of claim 1, wherein the transform adaptor updates the transform configuration by: generating an updated transform configuration in a frequency domain based on the composite residue signal; modifying the updated transform configuration in the frequency domain according to a transform modification configuration; converting the modified updated transform configuration to a time domain; and updating the transform configuration based on the time-domain-converted modified updated transform configuration.

9. The system of claim 8, wherein the transform adaptor modifies the updated transform configuration by smoothing, in the frequency domain, at least one of a magnitude response of the updated transform configuration and a phase response of the updated transform configuration.

10. The system of claim 9, wherein the transform adaptor smooths the response by identifying a rapidly varying section of the response and modifying the response in the rapidly varying section.

11. The system of claim 1, wherein the transform adaptor updates the transform configuration by: generating the updated transform configuration in a frequency domain based on the composite residue signal; modifying the updated transform configuration in the frequency domain according to a transform modification configuration; converting the modified updated transform configuration to a time domain; and updating the transform configuration based on the time-domain-converted modified updated transform configuration.

12. The system of claim 11, wherein modifying the updated transform configuration in the frequency domain causes a size reduction of the time-domain-converted modified updated transform configuration.

13. The system of claim 11, wherein the transform adaptor modifies the updated transform configuration by smoothing a magnitude response in the frequency domain of the updated transform configuration.

14. The system of claim 13, wherein the transform adaptor smooths the magnitude response by identifying a rapidly varying section of the magnitude response based on a derivative of the magnitude response with respect to frequency, and modifying the rapidly varying section to reduce the derivative of the magnitude response.

15. The system of claim 14, wherein the transform adaptor modifies the rapidly varying section by replacing the rapidly varying section with an exponential decay response fit to the rapidly varying section.

16. The system of claim 14, wherein the transform adaptor modifies the rapidly varying section by replacing the rapidly varying section with a polynomial response fit to the rapidly varying section.

17. The system of claim 14, wherein the transform adaptor modifies the rapidly varying section by filtering the rapidly varying section using median filtering or convolution filtering.

18. The system of claim 11, wherein the transform adaptor modifies the updated transform configuration by smoothing a phase response in the frequency domain of the updated transform configuration.

19. The system of claim 18, wherein the transform smooths the phase response by identifying a rapidly varying section of the phase response based on a derivative of the phase response with respect to frequency, and modifying the rapidly varying section to reduce the derivative of the phase response.

20. The system of claim 19, wherein the transform adaptor modifies the rapidly varying section by replacing the rapidly varying section with a linear response fit to the rapidly varying section.

21. The system of claim 19, wherein the transform adaptor modifies the rapidly varying section by filtering the rapidly varying section using median filtering or convolution filtering.

* * * * *